US012585472B2

(12) United States Patent
Cote et al.

(10) Patent No.: US 12,585,472 B2
(45) Date of Patent: Mar. 24, 2026

(54) CONFIGURATION OF UNPOWERED DEVICES

(71) Applicant: GENETEC INC., St-Laurent (CA)

(72) Inventors: Louis-Martin Cote, Montreal (CA);
Mathieu Leduc, Montreal (CA)

( * ) Notice: Subject to any disclaimer, the term of this
patent is extended or adjusted under 35
U.S.C. 154(b) by 184 days.

(21) Appl. No.: 18/050,121

(22) Filed: Oct. 27, 2022

(65) Prior Publication Data

US 2024/0143336 A1      May 2, 2024

(51) Int. Cl.
 *G06F 1/18*          (2006.01)
 *G06F 9/4401*        (2018.01)
 *H04B 1/08*          (2006.01)
 *H04B 5/70*          (2024.01)

(52) U.S. Cl.
 CPC .............. G06F 9/4401 (2013.01); G06F 1/18
   (2013.01); H04B 1/08 (2013.01); H04B 5/70
   (2024.01)

(58) Field of Classification Search
 CPC ........... G06F 9/4401; G06F 1/18; H04B 5/70;
                                              H04B 1/08
 USPC ................................................. 206/701, 722
 See application file for complete search history.

(56) References Cited

U.S. PATENT DOCUMENTS

| | | | | |
|---|---|---|---|---|
| 5,935,227 | A | * | 8/1999 | Phan .......................... G06F 1/18 |
| | | | | 710/100 |
| 8,117,445 | B2 | | 2/2012 | Werner et al. |
| 8,762,742 | B2 | | 6/2014 | Buer |
| 8,811,896 | B2 | | 8/2014 | Katz et al. |
| 9,588,711 | B2 | | 3/2017 | Ogawa |
| 9,722,864 | B2 | | 8/2017 | Hou et al. |
| 10,873,367 | B2 | | 12/2020 | Koeppel et al. |
| 11,200,561 | B2 | | 12/2021 | Chang |
| 2008/0041930 | A1 | | 2/2008 | Smith et al. |

(Continued)

FOREIGN PATENT DOCUMENTS

| | | |
|---|---|---|
| CN | 101826895 A | 9/2010 |
| FR | 3112225 A1 | 1/2022 |
| WO | 2015/026401 A1 | 2/2015 |

OTHER PUBLICATIONS

McDonnell, James, et al. "Memory spot: A labeling technology."
IEEE Pervasive Computing 9.2 (2010): 11-17. https://citeseerx.ist.
psu.edu/viewdoc/download?doi=10.1.1.174.5720&rep=rep1&type=
pdf.

*Primary Examiner* — Jacob K Ackun
(74) *Attorney, Agent, or Firm* — Anglehart et al.

(57) ABSTRACT

The present disclosure relates to configurable electronic
devices, packaging therefor, electronic device products, as
well as methods and systems for configuring configurable
electronic devices whilst unpowered. The electronic device
includes a housing and a configuration system contained
therein. The housing bears a first visual indicia indicative of
a location for applying an external electromagnetic field to
the electronic device for configuring the same in an unpow-
ered state. The packaging includes a main enclosure for
removably retaining the electronic device therein, at least
part of the main enclosure being composed of a material
transparent to the external electromagnetic field, and a
second visual indicia which is born on an outward-facing
surface of the main enclosure. The second visual indicia is
indicative of the location for applying the external electro-
magnetic field and disposed in proximity to the first visual
indicia when the electronic device is received within the
packaging.

37 Claims, 11 Drawing Sheets

(56) References Cited

U.S. PATENT DOCUMENTS

| 2008/0230439 A1* | 9/2008 | Abrams | ................... G06F 1/20 |
| | | | 206/723 |
| 2010/0291867 A1 | 11/2010 | Abdulla et al. | |
| 2015/0002891 A1 | 1/2015 | Kadota | |
| 2015/0237584 A1 | 8/2015 | Royston | |
| 2019/0317564 A1* | 10/2019 | Hamann | ............... G06F 1/1628 |
| 2020/0343314 A1* | 10/2020 | Nakamura | ............ G06F 1/1698 |

* cited by examiner

Processor
410

Instructions
430

Memory
420

404

400

402

CONFIGURATION OF UNPOWERED DEVICES

FIELD

The present disclosure relates generally to electronic devices, and more specifically to configuring electronic devices.

BACKGROUND

Electronic devices are used for a wide variety of purposes and are deployed in a range of different scenarios. Some electronic devices are designed to perform multiple different tasks based on user input and/or preprogramming, and some electronic devices are designed to perform a limited range of tasks. In many cases, though, electronic devices are configurable in one way or another, whether to alter their functionality, provision certain accesses, select one of many operating modes, or the like. The configurability of electronic devices is one advantage over many previous types of machines and devices.

Traditionally, electronic devices have been configurable via a user input of some kind. In some cases, the user provides the electronic device with a configuration file. In some other cases, the user might navigate to a configuration menu using a user input device and modify the configuration of the electronic device via the menu. Configuration information is stored in a memory or similar storage device, via one or more switchable elements, or the like, so that the electronic device may retrieve or otherwise employ the configuration data and use it in its operation, to ensure that it is operating in concordance with the rules, settings, or other preferences laid out in the configuration data.

Electronic devices are often provided to users in a default state, which is to say that the electronic device is provided with various default configuration parameters, which the user may want to modify before using the electronic device for its intended purpose. However, having to unbox and power on the device in order to configure it may be less than ideal in certain circumstances.

As a result, there may be interest in devices which are configurable in an unpowered state.

SUMMARY

This summary includes an overview of some examples for the purpose of illustration. Additional details are provided in the Detailed Description. While existing approaches for configuring electronic devices are suitable for their purposes, they typically rely on an end user having sufficient access to the device to power it on and interact with it via a user input of some kind. In certain cases, being able to configure a device whilst the device remains powered off, for instance whilst still in its packaging, would present advantages to an end user. For clarity, reference to and discussion of electronic devices in the foregoing should be understood as not excluding other types of devices, including computing devices, electric devices with electronic or computer controllers, or the like.

One example scenario is a situation in which the end user of an electronic device lacks the necessary competency to properly configure the electronic device, or otherwise wishes to offload the configuration task to another party. Another example scenario is a situation in which the end user of the electronic device is operating the electronic device for the benefit of another party, such as a supervisor, head office, or similar authority: the authority may wish to have the device configured in a particular way before delivery to the end user, whilst ensuring that the end user does not need to perform the configuration, or that the end user is unaware of the particulars of the configuration applied to the device. In scenarios such as these, being able to apply a configuration to an electronic device whilst still in its original packaging enables the configuration to be performed in a manner transparent to the end user.

To this end, the present disclosure describes (in one or more example implementations) electronic devices which are configurable whilst powered off and packaging for such devices which enables this unpowered configuration. An example device is provided with a configuration system via which the device may be configured, even in an unpowered state. In an example implementation, the configuration system includes an antenna susceptible to an external electromagnetic field, which provides power to the configuration system. A data stream, which may be carried via the external electromagnetic field, supplies information to the configuration system via the antenna, and the configuration system may cause some or all of the information to be stored in a memory thereof. To facilitate configuration of the electronic device, the electronic device bears a visual indicia on a housing of the electronic device, which indicates a location at which the external electromagnetic field should be applied to configure the device.

The electronic device may be provided to an end user (or to any other party, like someone performing configuration of the electronic device) in a packaging: together, the electronic device and the packaging form an electronic device product. The packaging is composed of a main enclosure, which removably retains the electronic device therein. At least part of the main enclosure is composed of a material which is transparent to the external electromagnetic field, thereby enabling the electronic device to be configured when retained within the packaging. The packaging also includes its own visual indicia, born on an outward-facing surface of the main enclosure, which also indicates the location at which the external electromagnetic field should be applied to configure the electronic device. As a result of both the visual indicia on the housing of the electronic device and the visual indicia born on the main enclosure identifying the location for application of the external electromagnetic field, the latter is disposed proximate to the former when the electronic device is received within the packaging.

The present disclosure describes, inter alia, electronic devices which are configurable when unpowered, as well as packaging for the same electronic devices, which removably retain the electronic devices and enable the configuration thereof when so retained.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In accordance with one general aspect, there is provided an electronic device product which may include an electronic device having a housing and a configuration system contained within the housing, the housing bearing on an outer surface thereof a first visual indicia indicative of a location for applying an external electromagnetic field to the electronic device for configuring the electronic device in an unpowered state. The electronic device product may also include a packaging, having: a main enclosure for removably retaining therein the electronic device, at least part of the main enclosure being composed of a material transparent to the external electromagnetic field to enable said configuring of the electronic device in the unpowered state; and a second visual indicia born on an outward-facing surface of the main enclosure, the second visual indicia indicative of the location for applying the external electromagnetic field to the electronic device and disposed in proximity to the first visual indicia when the electronic device is received within the packaging.

In at least some embodiments according to any one or more of the previous embodiments, the main enclosure is entirely composed of the material transparent to the external electromagnetic field.

In at least some embodiments according to any one or more of the previous embodiments, the second visual indicia may include a portion of the main enclosure which is composed of a first material different from at least a second material composing a remainder of the main enclosure.

In at least some embodiments according to any one or more of the previous embodiments, the first material is transparent visually and to the external electromagnetic field, the first visual indicia being visible through the portion of the main enclosure.

In at least some embodiments according to any one or more of the previous embodiments, the main enclosure defines an indentation in the outward-facing surface thereof for removably receiving an external device producing the external electromagnetic field.

In at least some embodiments according to any one or more of the previous embodiments, the indentation is disposed proximate to the second visual indicia.

In at least some embodiments according to any one or more of the previous embodiments, the second visual indicia is disposed within the indentation.

In at least some embodiments according to any one or more of the previous embodiments, the second indicia may include at least part of the indentation.

In at least some embodiments according to any one or more of the previous embodiments, at least part of the indentation is transparent visually, the first visual indicia being visible through the at least part of the indentation.

In at least some embodiments according to any one or more of the previous embodiments, the second visual indicia being disposed in proximity to the first visual indicia may include the second visual indicia overlapping with the first visual indicia when the electronic device is received within the packaging.

In at least some embodiments according to any one or more of the previous embodiments, a seal is applied to a portion of the main enclosure to securely retain therein the electronic device, where the seal is transparent to the external electromagnetic field.

In at least some embodiments according to any one or more of the previous embodiments, the second visual indicia is disposed on the seal.

In at least some embodiments according to any one or more of the previous embodiments, the packaging may include a brace disposed within the main enclosure for removably securing the electronic device therewithin.

In at least some embodiments according to any one or more of the previous embodiments, the brace removably securing the electronic device therewithin may include enforcing a pose of the electronic device within the main enclosure.

In at least some embodiments according to any one or more of the previous embodiments, the brace forms part of the main enclosure.

In at least some embodiments according to any one or more of the previous embodiments, the packaging may include a printed unique resource locator born on the main enclosure, the unique electronic resource locator indicating a target address at which an application associated with the electronic device is obtainable.

In accordance with another general aspect, there is provided a packaging which may include a main enclosure for removably retaining therein the electronic device, at least part of the main enclosure being composed of a material transparent to the external electromagnetic field to enable said configuration of the electronic device in the powered off state. The packaging may also include a second visual indicia born on an outward-facing surface of the main enclosure, the second visual indicia indicative of the location for applying the external electromagnetic field to the electronic device and disposed in proximity to the first visual indicia when the electronic device is received within the packaging.

In at least some embodiments according to any one or more of the previous embodiments, the main enclosure is entirely composed of the material transparent to the external electromagnetic field.

In at least some embodiments according to any one or more of the previous embodiments, the second visual indicia may include a portion of the main enclosure which is composed of a first material different from at least a second material composing a remainder of the main enclosure.

In at least some embodiments according to any one or more of the previous embodiments, the first material is transparent visually and to the external electromagnetic field, the first visual indicia being visible through the portion of the main enclosure.

In at least some embodiments according to any one or more of the previous embodiments, the main enclosure defines an indentation in the outward-facing surface thereof for removably receiving an external device producing the external electromagnetic field.

In at least some embodiments according to any one or more of the previous embodiments, the indentation is disposed proximate to the second visual indicia.

In at least some embodiments according to any one or more of the previous embodiments, the second visual indicia is disposed within the indentation.

In at least some embodiments according to any one or more of the previous embodiments, the second indicia may include at least part of the indentation.

In at least some embodiments according to any one or more of the previous embodiments, at least part of the indentation is transparent visually, the first visual indicia being visible through the at least part of the indentation.

In at least some embodiments according to any one or more of the previous embodiments, the second visual indicia being disposed in proximity to the first visual indicia may include the second visual indicia overlapping with the first visual indicia when the electronic device is received within the packaging.

In at least some embodiments according to any one or more of the previous embodiments, a seal is applied to a portion of the main enclosure to securely retain therein the electronic device, where the seal is transparent to the external electromagnetic field.

In at least some embodiments according to any one or more of the previous embodiments, the second visual indicia is disposed on the seal.

In at least some embodiments according to any one or more of the previous embodiments, the packaging may include a brace disposed within the main enclosure for removably securing the electronic device therewithin.

In at least some embodiments according to any one or more of the previous embodiments, the brace removably securing the electronic device therewithin may include enforcing a pose of the electronic device within the main enclosure.

In at least some embodiments according to any one or more of the previous embodiments, the brace forms part of the main enclosure.

In accordance with a further general aspect, there is provided a packaging for an electronic device configurable in an unpowered state via a configuration system thereof, at least the configuration system being contained in a housing of the electronic device, the housing comprising a location for applying an external electromagnetic field to the electronic device for configuration thereof via the configuration system. The packaging may include a main enclosure for removably retaining therein the electronic device, at least part of the main enclosure being composed of a material transparent to the external electromagnetic field to enable said configuration of the electronic device in the powered off state. The packaging may also include a visual indicia born on an outward-facing surface of the main enclosure, the visual indicia indicative of the location for applying the external electromagnetic field to the electronic device and disposed in proximity to the location of the housing when the electronic device is received within the packaging.

In at least some embodiments according to any one or more of the previous embodiments, the main enclosure is entirely composed of the material transparent to the external electromagnetic field.

In at least some embodiments according to any one or more of the previous embodiments, the visual indicia may include a portion of the main enclosure which is composed of a first material different from at least a second material composing a remainder of the main enclosure.

In at least some embodiments according to any one or more of the previous embodiments, the first material is transparent visually and to the external electromagnetic field, and a product visual indicia born on an outer surface of the housing and indicative of the location of the housing is visible through the portion of the main enclosure.

In at least some embodiments according to any one or more of the previous embodiments, the main enclosure defines an indentation in the outward-facing surface thereof for removably receiving an external device producing the external electromagnetic field.

In at least some embodiments according to any one or more of the previous embodiments, the indentation is disposed proximate to the visual indicia.

In at least some embodiments according to any one or more of the previous embodiments, the visual indicia is disposed within the indentation.

In at least some embodiments according to any one or more of the previous embodiments, the visual indicia may include at least part of the indentation.

In at least some embodiments according to any one or more of the previous embodiments, at least part of the indentation is transparent visually, a product visual indicia born on an outer surface of the housing and indicative of the location of the housing being visible through the at least part of the indentation.

In at least some embodiments according to any one or more of the previous embodiments, the visual indicia being disposed in proximity to the location of the housing may include the visual indicia overlapping with a product visual indicia born on an outer surface of the housing and indicative of the location of the housing when the electronic device is received within the packaging.

In at least some embodiments according to any one or more of the previous embodiments, a seal is applied to a portion of the main enclosure to securely retain therein the electronic device, where the seal is transparent to the external electromagnetic field.

In at least some embodiments according to any one or more of the previous embodiments, the visual indicia is disposed on the seal.

In at least some embodiments according to any one or more of the previous embodiments, the packaging may include a brace disposed within the main enclosure for removably securing the electronic device therewithin.

In at least some embodiments according to any one or more of the previous embodiments, the brace removably securing the electronic device therewithin may include enforcing a pose of the electronic device within the main enclosure.

In at least some embodiments according to any one or more of the previous embodiments, the brace forms part of the main enclosure.

In accordance with another general aspect, there is provided a configurable electronic device which may include a primary memory powerable by a power source coupled thereto. The configurable electronic device may also include a configuration memory for storing configuration data, the configuration memory separate from the primary memory. The configurable electronic device may furthermore include an antenna coupled to the configuration memory to provide power thereto when subjected to an external electromagnetic field and to transmit configuration data obtained via a data stream to the configuration memory for storage therein. The configurable electronic device may in addition include a primary controller powerable by the power source and coupled to the primary memory and to the configuration memory, the primary controller configured for, upon powering on of the electronic device via the power source: querying the configuration memory to determine a presence of the configuration data; and responsive to said determining the presence of the configuration data, loading the configuration data into the primary memory to cause the electronic device to operate in accordance with the configuration data. Other embodiments of this aspect include corresponding computer systems, apparatus, and computer programs recorded on one or more computer storage devices, each configured to perform the actions of the methods.

In at least some embodiments according to any one or more of the previous embodiments, the primary controller is configured for, upon said powering on of the electronic device and responsive to determining an absence of the configuration data, causing the electronic device to operate in accordance with alternative configuration data, where the alternative configuration data is one of default configuration data, past configuration data, and backup configuration data.

In at least some embodiments according to any one or more of the previous embodiments, the primary controller is configured for, upon said powering on of the electronic device, validating a digital signature associated with the configuration data, where said loading the configuration data into the primary memory is responsive to the digital signature associated with the configuration data being validated.

In at least some embodiments according to any one or more of the previous embodiments, the primary controller is configured for, upon said powering on of the electronic device, comparing a first timestamp, associated with the configuration data, with a second timestamp, associated with alternative configuration data, where said loading the configuration data into the primary memory is responsive to the first timestamp being more recent than the second timestamp.

In at least some embodiments according to any one or more of the previous embodiments, the primary controller is configured for, following said loading the configuration data into the primary memory, communicating a message to a remote server identified in the configuration data.

In at least some embodiments according to any one or more of the previous embodiments, the primary controller is configured for, following said loading the configuration data into the primary memory: performing a validation of the configuration data; and loading alternative configuration data into the primary memory to cause the electronic device to operate in accordance with the alternative configuration data responsive to the configuration data failing the validation.

In at least some embodiments according to any one or more of the previous embodiments, the configurable electronic device includes an enclosure containing at least some of the primary memory, the configuration memory, the antenna, and the primary controller, the enclosure bearing an indicia on an outward-facing surface thereof indicative of a location for applying the external electromagnetic field to subject the antenna thereto.

In at least some embodiments according to any one or more of the previous embodiments, the configurable electronic device includes a display configured for presenting an indication responsive to the configuration memory having successfully stored the configuration data obtained via the external electromagnetic field.

In at least some embodiments according to any one or more of the previous embodiments, the indication presented by the display is persistent beyond a presence of the external electromagnetic field to which the antenna is subjected.

In at least some embodiments according to any one or more of the previous embodiments, the configuration memory is configured for providing a confirmation via the antenna to an external device when queried, the confirmation relating to a configuration status of the electronic device.

In at least some embodiments according to any one or more of the previous embodiments, the confirmation provides an indication of the configuration data stored in the configuration memory.

Implementations of the described techniques may include hardware, a method or process, or a computer tangible medium.

In accordance with a further general aspect, there is provided a method for configuring a configurable electronic device, which comprising a primary memory powerable by a power source coupled thereto, a configuration memory separate from the primary memory, an antenna coupled to configuration memory, and a primary controller powerable by the power source and coupled to the primary memory and to the configuration memory. The method may include harvesting, by the antenna, energy from an external electromagnetic field. The method may also include obtaining, by the antenna, a data stream from an external device, the data stream having configuration data. The method may furthermore include storing at least the configuration data in the configuration memory, the configuration memory being powered by the antenna using the energy harvested from the external electromagnetic field. The method may in addition include upon powering on of the electronic device via the power source: querying the configuration memory to determine a presence of the configuration data therein; and responsive to said determining the presence of the configuration data, loading the configuration data into the primary memory to cause the electronic device to operate in accordance with the configuration data. Other embodiments of this aspect include corresponding computer systems, apparatus, and computer programs recorded on one or more computer storage devices, each configured to perform the actions of the methods.

BRIEF DESCRIPTION OF THE DRAWINGS

For a more complete understanding of the present disclosure, reference is now made to the accompanying drawings. The following brief descriptions of the drawings should not be considered limiting in any fashion.

It will be noted that throughout the appended drawings like features are identified by like reference numerals.

DETAILED DESCRIPTION

The present disclosure relates to the unpowered configuration of electronic devices and to various related methods, including methods for configuring a configurable electronic device, as well as to electronic device products, including the electronic device and packaging therefor. In the present disclosure, electronic devices may be referred to as being "unpowered", in an "unpowered state", or the like; it should be understood that these expressions, are others like them, are substantively equivalent to one another, unless otherwise specified. An electronic device may be considered to be unpowered when a power switch on the electronic device is set to an "off" position, when a power cable or other power-delivery implement (e.g., network power over Ethernet) is detached or otherwise removed from the electronic device, when a device is turned off via another user input, or in any other suitable situation in which at least part of the electronic device is unpowered. An electronic device need not be completely non-functional to be considered unpowered: for example, a battery internal to the electronic device may be used to power a timing circuit or other internal timekeeping function, whilst the remainder of the device be unpowered and non-functional. By way of another example, a power source of an electronic device may have access to external power for powering the electronic device, for instance by way of a power cable, but the electronic device may be considered unpowered until a power switch is set to the "on" position, or the electronic device is otherwise powered on. It should be understood that the above examples and definitions are provided for the purposes of illustration, and should not be interpreted as unduly limiting of the present disclosure.

Figure 1:
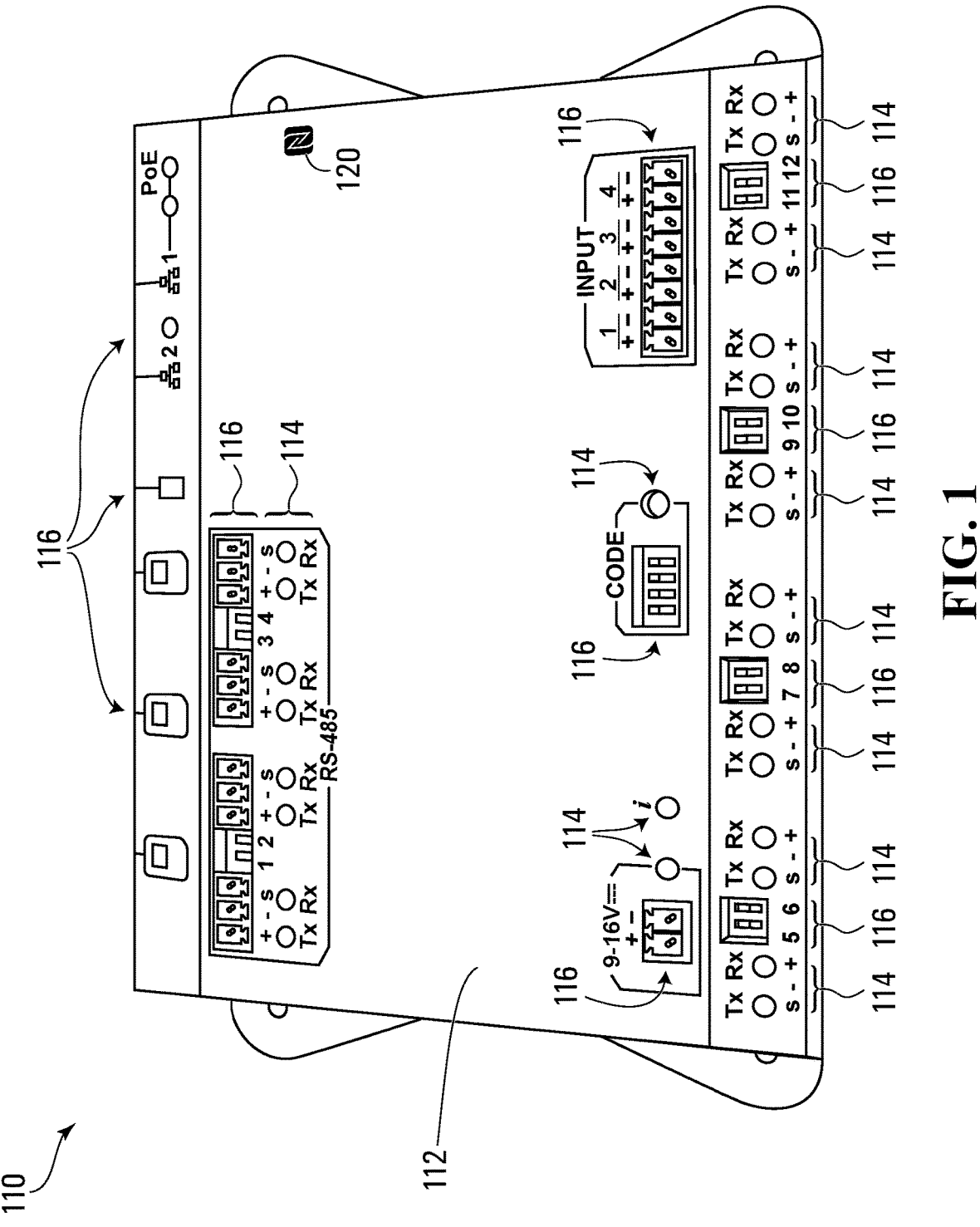
FIG. 1 is a schematic diagram of an example electronic device configurable in an unpowered state.

With reference to FIG. 1, there is illustrated an example electronic device 110. The electronic device 110 is composed of a housing 112, which stores therein various circuitry, computing elements, and the like, for implementing the functionality of the electronic device 110. In some embodiments, the electronic device 110 also includes various displays 114: in the illustrated example of FIG. 1, the displays 114 include a number of indicator lights, for instance light-emitting diodes, which are at least in part contained within the housing 112. It should be understood, however, that in other embodiments, the electronic device 110 includes other display elements: in one example, the electronic device 110 includes a screen or similar display element; in another example, the electronic device includes audio displays (e.g., speakers), tactile displays (e.g., vibrational elements), or other types of displays, as appropriate. It should also be understood that in some further embodiments, the electronic device 110 includes no displays 114. The electronic device 110 also includes various interfaces 116, via which the electronic device 110 receives inputs and/or provides outputs to other devices. The interfaces 116 may be analog or digital, and may send or receive information according to any suitable format and protocol, as appropriate. One or more of the interfaces 116 may also be for supplying power to the electronic device 110, and/or for enabling the electronic device 110 to supply power to one or more other devices to which the electronic device 110 is coupled.

The housing 112 also has various printed elements disposed on an outer surface thereof, which may include branding information, product identification information, aesthetic elements, and the like. Additionally, the housing 112 bears, on the outer surface, a visual indicia 120, which is indicative of a location at which an external electromagnetic field (EMF) can be applied to the electronic device 110 in order to configure the electronic device 110 whilst in an unpowered state. The visual indicia 120 may be applied at any suitable location on the outer surface of the housing 112, depending on where the external EMF should be applied to effect configuration of the electronic device 110, as described in detail herein. In the illustrated example of FIG. 1, the visual indicia 120 is a near-field communication (NFC) insignia printed on the outer surface of the housing 112, though it should be understood that other visual indicia are also considered. For instance, a symbol suggestive of wireless communication, of a radio frequency identification (RFID) type device, or the like, can be apposed to the outer surface of the housing 112 to serve as the visual indicia 120. By way of another example, the visual indicia 120 may not be a symbol or insignia, but is instead an aesthetic element applied to the outer surface of the housing 112; instructions supplied with the electronic device 110, for instance on or within the packaging, or at a website of the manufacturer, may confirm to a user which aesthetic element acts as the visual indicia 120. Other types of visual indicia are also considered: in one example, the visual indicia 120 is wholly formed with the housing 112, rather than printed thereon. For instance, a bump, embossing, or similar changes in relief of the housing 112 acts as the visual indicia 120. Other approaches are also considered.

As described in detail herein, the housing 112 contains therein various circuitry, computing elements, and other elements necessary for enabling the functionality of the electronic device 110. The electronic device 110 may include various processing units (e.g., processors), one or more storage devices (e.g., memories), and one or more interfaces, including part or all of the interfaces 116, as well as one or more wireless interfaces which may be substantially or completely contained within the housing 112. Depending on the particular functionality of the electronic device 110, the components thereof, including the displays 114, the interfaces 116, and the components internal to the housing 112 will vary. In other words, different electronic devices 110, built for different purposes, will have different configurations of displays 114, interfaces 116, and other components, and the housing 112 is constructed accordingly. By way of an example, the electronic device 110 is an access control gateway, which connects to a variety of access control devices (e.g., door controls, access card readers, etc.) to coordinate and control their operation. In this example, the electronic device 110 includes sufficient interfaces 116 to connect, wiredly and/or wirelessly, with the access control devices it operates, and may also connect with a main access control system or server. Displays 114 may include indicator lights, screens, and/or other displays to indicate proper functioning of the device and/or errors in operation of the device, as appropriate. By way of another example, the electronic device 110 is a video management system, which connects to a variety of cameras (which may record video and/or still images) to acquire and store data therefrom, to run analytics on the acquired data, to provide the data to other elements of an environment, and the like. In this example, the electronic device 110 includes sufficient interfaces 116 to connect, wiredly and/or wirelessly, with the cameras, and may also connect with a cloud-based storage system and/or with a local (on-premises) storage system. Displays 114 may include indicator lights, screens, and/or other displays to indicate proper functioning of the device and/or errors in operation of the device, as appropriate, and may include a screen via which video footage from the cameras may be viewed and/or replayed. In still further examples, the electronic device 110 may be other types of devices, fulfilling other types of operations, controlling other types of devices, and the like. For instance, the electronic device 110 may be a network-accessible storage (NAS) device, a router, a video game console, or any other device for which configuration of the device whilst unpowered would be beneficial.

Figure 2:
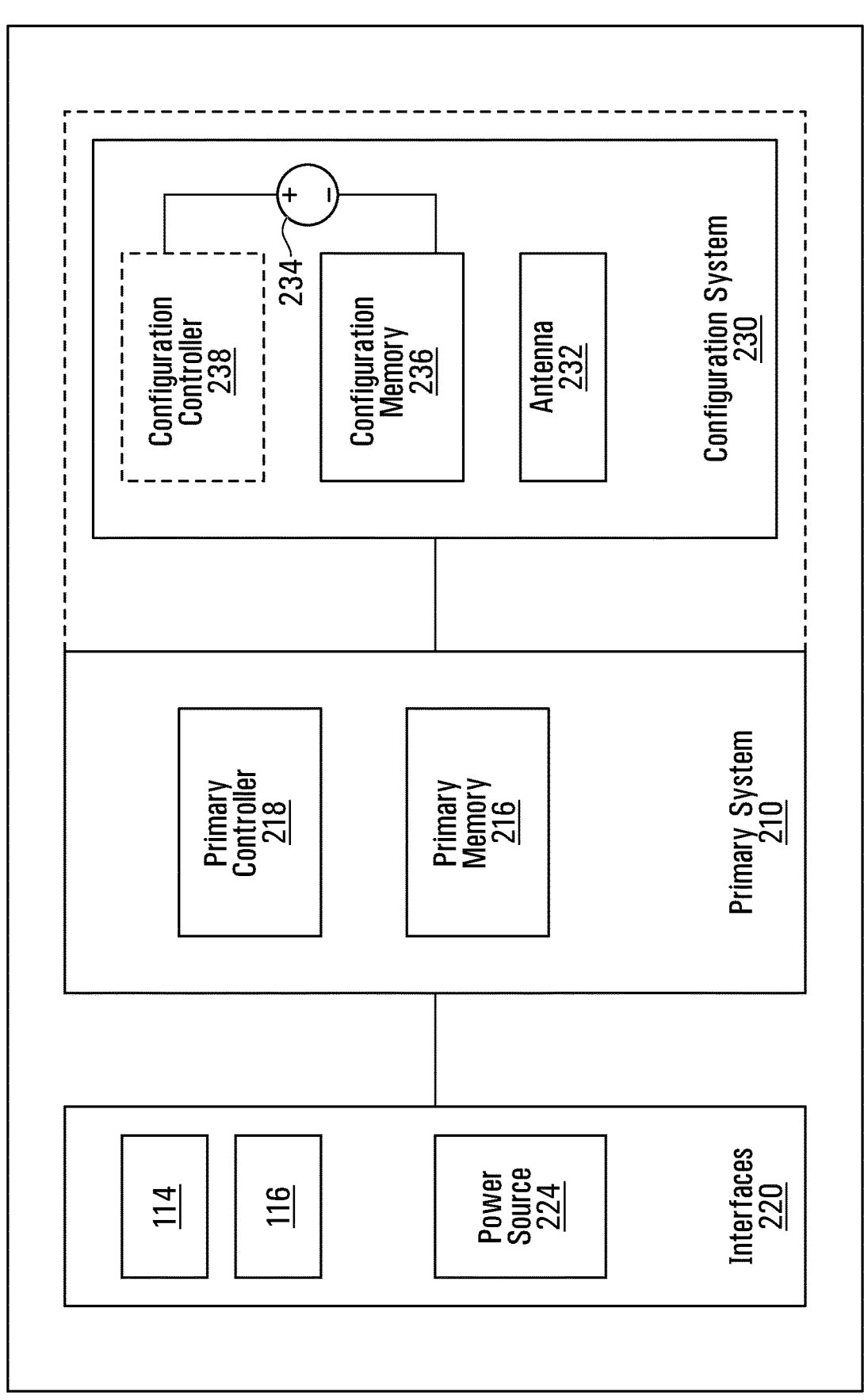
FIG. 2 is a block diagram of an example implementation of the electronic device of FIG. 1.

With additional reference to FIG. 2, the electronic device 110 is illustrated in block diagram form as being composed of a primary system 210, interface(s) 220, and a configuration system 230. The primary system 210 is composed of various components, including a primary controller 218 and a primary memory 216, although the primary system 210 may also include any additional number of processing units, storage elements, and the like, and serves to implement part, most, or substantially all of the functions of the electronic device 110. The interfaces 220 include the displays 114 and the interfaces 116 described hereinabove, as well as a power source 224, which acts as the primary source of electrical power for the electronic device 110. The configuration system 230, which is also coupled to the primary system 210, includes an antenna 232, a power source 234, and a configuration memory 236, and in some embodiments may include a configuration controller 238. The configuration system 230 enables the electronic device 110 to be configured in an unpowered state, as described in detail herein.

The power source 224 may be any suitable type of source of electrical power, may be connectable to an electrical network of any suitable type and in any suitable capacity, and may supply electrical power to the primary system 210, to the configuration system 230, and to other ones of the interfaces 220 at any suitable level of voltage and current, as appropriate. For example, the power source 224 may include any suitable number and type of rectifiers, filters, transformers, and the like, and may be connectable to an electrical network via a cable or the like, or may be couplable wirelessly, for instance in the case of inductive power transfer. Other approaches are also considered. When the electronic device 110 is unpowered, the electronic device 110 receives no electrical power from the power source 224, although the power source 224 may itself be connected to an external source. For instance, the power source 224 is connected by a cable to an electrical power network, and a switch of the power source 224, or associated therewith, is placed in an OFF state. In this instance, although the power source 224 has access to electrical power, the switch being in the OFF state prevents any electrical power from reaching the electronic device 110, and thus causes the electronic device 110 to be in the unpowered state.

The interfaces 220 may also include any suitable number of other interfaces, for instance one or more wireless interfaces, and the like. The interfaces 220 are communicatively coupled to the primary system 210 to facilitate the exchange of information between the primary system 210 of the electronic device 110 and other devices to which the electronic device 110 may be coupled. For example, the interfaces 220 may include one or more WiFi™ or other wireless internet interfaces, one or more Bluetooth® or other wireless communication interfaces, and the like.

The electronic device 110 may be configurable in other ways when in other states. For example, when in a powered state (i.e., the electronic device 110 is powered on via the power source 224), various aspects of the electronic device 110 may be configured by way of the primary system 210. The primary system 210 may receive input from a user, from another electronic device or system, or the like, via the interfaces 220, which may instruct particular configurations of the electronic device 110, for instance by providing a configuration file or other configuration data to the primary system 210. In some embodiments, the electronic device 110 can present a webpage or other interface to a user when coupled to a computer or other device via one of the interfaces 220. For instance, the electronic device 110 can be connected to a computer via an ethernet cable (using an ethernet port of the interfaces 220), and the user can access a webpage or similar graphical user interface stored on the electronic device 110, for instance in the primary memory 216. The webpage displays various interactive controls which allow the user to alter the configuration of the electronic device 110, for instance by selecting options from a menu, changing checkboxes or radio buttons, and the like. Changes made via the interactive controls of the webpage may be used to update a configuration file or other repository of configuration data (e.g., stored in the primary memory 216 and/or in the configuration memory 236), for instance in response to a "Save Changes" interactive button, in substantially real-time in response to the changes, or in any other suitable fashion. Other approaches for configuring the electronic device when in a powered state are also considered. Also, in certain cases, when transitioning from an unpowered state to a powered state, the electronic device 110 may perform certain configuration tasks initiated as part of an unpowered configuration, in response to an unpowered configuration, and the like. Additionally, in some embodiments, one or more of the interfaces 220 may be coupled to the configuration system 230, whether via the primary system 210 or not, depending on the particular implementation of the electronic device 110.

Although illustrated generically in FIG. 2, it should be understood that the primary system 210 may be formed of any number of subcomponents, which are abstracted in FIG. 2 for the purposes of simplicity and streamlining the present disclosure. In some embodiments, the primary system 210, in conjunction with the interface(s) 220, perform all remaining functions of the electronic device 110 aside from those performed by the configuration system 230, that is to say, all remaining functions excepting the function of configuration of the electronic device 110 when unpowered. Additionally, the distinction between the primary system 210 and the configuration system 230 illustrated in FIG. 2 may also be an abstraction: for instance, the primary system 210 and configuration system 230 may be present together on the same physical circuit board within the housing 112 of the electronic device 110, or may be integrated with one another in other ways, despite being illustrated as separate elements in FIG. 2. Thus, the configuration system 230 may be, in a physical and/or structural sense, a component of the primary system 210, but is illustrated separately here to facilitate the present disclosure, and to clarify that the primary system 210 and the configurations system 230 perform different functions of the electronic device 110. The distinction between the primary system 210 and the configuration system 230 may thus be considered, in some embodiments, to be functional rather than structural, though in some embodiments there may also be a structural distinction therebetween, and in some embodiments, there may be functional overlap between the primary system 210 and the configuration system 230, as appropriate.

Figure 3:
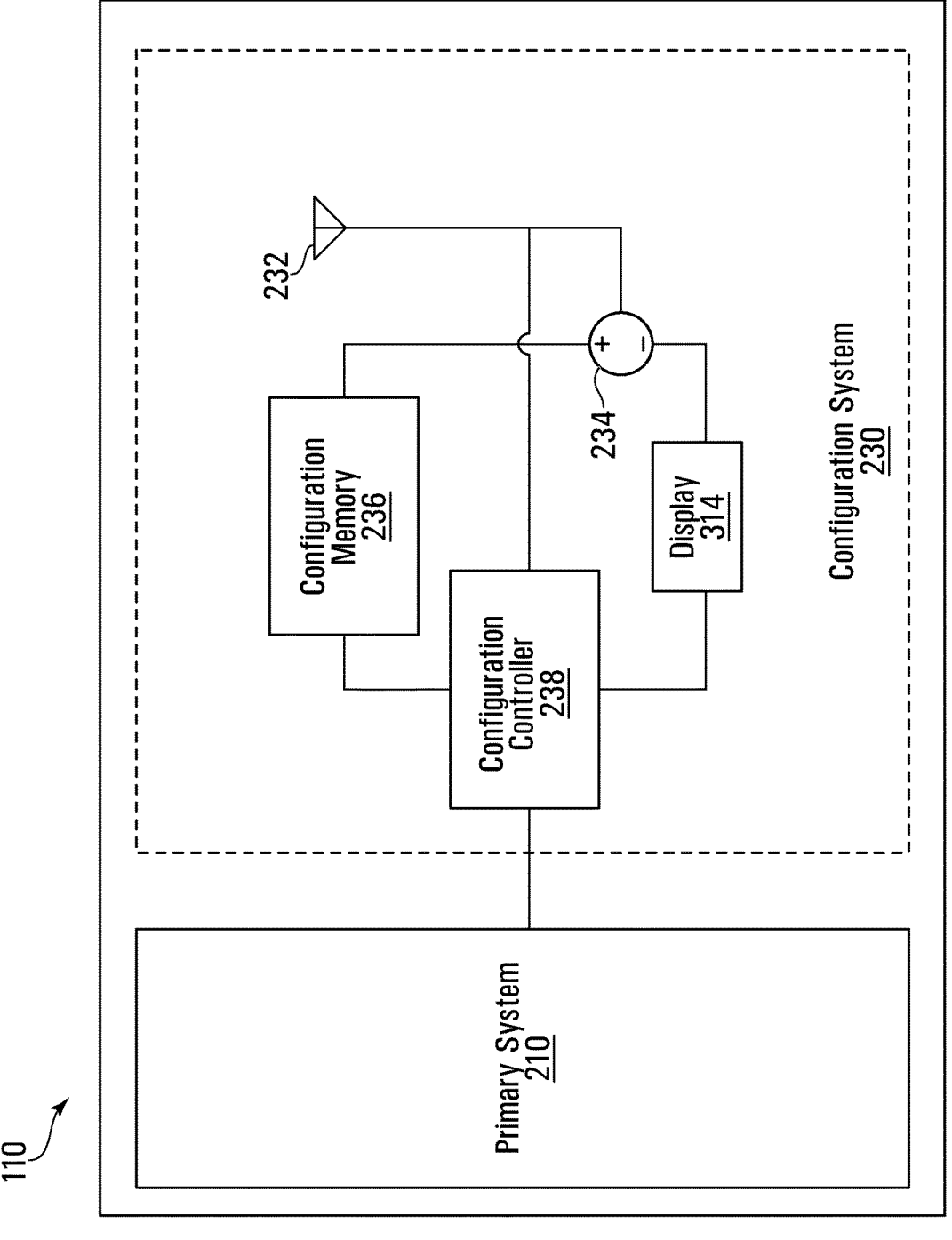
FIG. 3 is a block diagram of an example implementation of a configuration system of the electronic device of FIG. 1.

With reference to FIG. 3, an example implementation of the configuration system 230 is illustrated within a portion of the electronic device 110. As noted above, the configuration system 230 enables configuration of the electronic device 110 when in an unpowered state. In practical terms, the configuration system 230 enables the electronic device 110 to be configured, via the configuration system 230, even when the primary system 210 is unpowered via the power source 224 and is otherwise non-functional (some or all of the interfaces 220 may also be unpowered and otherwise non-functional during the configuration of the electronic device 110). The configuration system 230, in the illustrated embodiment, comprises the antenna 232, a power source 234, the configuration memory 236, the configuration controller 238, and a display 314 (which may be part of the displays 114). The antenna 232 is coupled to the power source 234 and to the configuration controller 238, and the power source 234 is also coupled to the configuration memory 236, as well as to the configuration controller 238 and the display 314, for providing power thereto. Although the embodiment illustrated in FIG. 3 shows the antenna 232 as coupled to the configuration memory 236 via the configuration controller 238, it should be understood that in other embodiments, the antenna 232 may be coupled to the configuration memory 236, including in embodiments in which the configuration controller 238 is omitted. In some embodiments, the antenna 232 may extend or protrude, in whole or in party, beyond the housing 112, for instance in embodiments in which the housing 112 is made of a material which impedes the transmission of EMFs (e.g., forming a Faraday cage).

As described hereinabove, the configuration system 230 is coupled to the primary system 210; although the coupling is illustrated here as the configuration controller 238 being coupled to the primary system 210, it should be understood that the configuration system 230 may be coupled to the primary 210 via any other sub-component(s) thereof. Additionally, it should be noted that in other embodiments, certain elements of configuration system 230 may be omitted, for instance the configuration controller 238 and the display 314. Other elements may also be included as part of the configuration system 230, as appropriate. Moreover, as described hereinabove, while the configuration system 230 and the primary system 210 are illustrated as separate elements, this may be an abstraction; the same may also be true for the elements included in the configuration system 230. Thus, the antenna 232 and the display 314 may structurally form part of the interfaces 220, for instance being one of any suitable number of wireless interfaces and displays, respectively, which may be physically collocated on a common circuit board, but are illustrated herein as forming part of the configuration system 230 to facilitate the present disclosure.

The antenna 232 is susceptible to incoming external EMFs of one or more particular types: for instance, the antenna 232 is susceptible to EMFs used in NFC-type communications, to EMFs used in RFID-type communications, and the like. When exposed to an incoming external EMF, the antenna 232 can harvest energy from the external EMF to produce electrical power, modeled here as power source 234. It should therefore be understood that the power source 234 is not a battery, nor a source dependent on wired coupling to an external power source, but instead a representation of the electrical power that the antenna 232 harvests from the incoming external EMF. The power source 234 serves to power the configuration memory 236, the configuration controller 238, and the display 314 (as well as any other components of the configuration system 230), such that the configuration system 230 can be operated even when the electronic device 110 is unpowered. In some embodiments, the power source 234 is implemented by way of one or more capacitors or similar charge-storing elements, which may store electrical power for a limited time following exposure to the incoming external EMF. In some embodiments, the power source 234 may also include a small battery or similar component, which may serve to supplement the electrical power produced using the incoming external EMF, for instance in cases in which the incoming external EMF provides an insufficient amount of energy with which the configuration system 230 would not otherwise be powerable (though the battery alone may also be insufficient for powering the configuration system 230). Other approaches for powering the configuration system 230 whilst at least the primary system 210, or indeed the remainder of the electronic device 110, remain unpowered are also considered.

The antenna 232 can also be used to extract, from an incoming external EMF, a data stream containing various information, including information suitable for configuring the electronic device 110, hereinafter referred to as "configuration data". The data stream may include various information, such as the identity of the external device providing the external EMF, information used as part of a handshaking process, security information, and the like, in addition to the configuration data. In some cases, a common incoming external EMF can include the data stream and sufficient energy for harvesting to power the configuration system 230; in some other cases, the data stream may be extracted from a separate incoming external EMF, which may be provided concurrently with the incoming external EMF providing the electrical power, or at some other time. For instance, two separate external devices may be used, with a first external device providing a first external EMF from which electrical power is harvested by the configuration system 230, and a second external device providing a second external EMF from which the configuration data is extracted. In some embodiments, the configuration system 230 may include multiple antennas 232, which may be differently configured; for instance, one or more antennas 232 are used to harvest the energy from one or more first external EMFs, and one or more other antennas 232 are used to extract the data stream from one or more second external EMFs. Alternatively, multiple antennas 232 may be configured to separately obtain, from one or more common external EMFs, the aforementioned harvested energy and extracted data stream. Other approaches are also considered. In the present disclosure, reference to a singular external EMF should be understood as being used for convenience, rather than as being limiting.

The source of the external EMF may be any suitable type of device external to the electronic device 110, including smartphones or other portable electronic devices, dedicated RFID or NFC devices (e.g., handheld readers), or the like. Upon being subjected to the incoming external EMF and extracting the data stream, the configuration system 230 is operable to power the configuration memory 236 using the energy extracted from the incoming external EMF (modeled as the power source 234) and to cause at least part of the information from the data stream to be stored in the configuration memory 236, including the configuration data. Because the configuration memory 236 is to be powered primarily by the power source 234—that is to say, primarily by energy extracted from the incoming external EMF—the physical implementation of the configuration memory 236 is selected as having sufficiently low power requirements as to be powerable by the power source 234, without relying on any additional power provided by the primary system 210, so that the configuration system 230 may be operable when the electronic device 110 is unpowered. The configuration memory 236 may be used to store, in addition to the configuration data, an identity of the external device having supplied the configuration data, security information relating to the external device, to the configuration data, and/or to the electronic device 110, metadata associated with the configuration data, and any other relevant information.

In one example of operation, the electronic device 110 can be configured via the configuration system 230 when the electronic device 110 itself is in an unpowered state. When the antenna 232 is subjected to an external EMF, for instance from a mobile device, the antenna harvests electrical power from the external EMF to power the configuration system 230, represented by the power source 234. The antenna 232 also extracts, from the external EMF, a data stream which includes at least configuration data for the electronic device 110. The power source 234 is used to power the configuration memory 236, as well as any processing functionality included as part of the configuration system 230. In some embodiments, the processing functionality may perform various operations, including extracting the data stream from the external EMF, obtaining the configuration data, as well as any other included information, from the data stream, and for storing the configuration data and other information in the configuration memory 236.

In some embodiments, the configuration data is stored in a particular portion of the configuration memory 236, or in a particular format within the configuration memory 236. For example, a first portion of the configuration memory 236 may store a default or baseline set of configuration data, and a second portion of the configuration memory 236 is reserved for storing configuration data obtained via the antenna 232. By way of another example, the configuration memory 236 may be configured for retaining copies of one or more previous sets of configuration data, and newly-acquired configuration data may be stored in the configuration memory 236 after the most recent set of previous configuration data, or in any other suitable configuration without overwriting any of the previous sets of configuration data to be retained.

In some embodiments, following successful loading of configuration data into the configuration memory 236, the display 314 may present an indication to the effect that the configuration data has successfully been extracted from the external EMF and stored within the configuration memory 236. The display 314 may be any suitable type of display, and thus may present the indication in any suitable fashion. By way of an example, the display 314 may be an indicator light, and the indication produced may include the indicator light flashing in a particular pattern, the indicator light illuminating for a set time, then ceasing illumination, or the like. By way of another example, the display 314 may include a speaker element, and the indication produced may include the speaker emitting a particular chime or other sound.

By way of a further example, the display 314 may be a screen, for instance an e-ink screen or similar type of screen which consumes power only when transitioning the state of the screen elements, and the indication produced may be a change in the screen elements of the screen, for instance changing from a dark pattern to a light pattern. By way of a still further example, the display 314 may include a mechanical indicator, for instance a movable element, which can be moved from a first position, indicative of an absence of configuration data, to a second position, which is indicative of a presence of configuration data. Other approaches are also considered, including other approaches in which the display 314 is used to present an indicator which is persistent beyond the presence of the external EMF to which the antenna 232 is subjected (which provides the power and data stream to the configuration system 230). In this fashion, a user tasked with configuring the electronic device 110 can look to the display 314 to confirm that the configuration data was properly stored within the configuration system 230, and, in cases where the display 314 presents a persistent indicator, even after the external EMF has been removed from the antenna 232. This may be particularly salient in situations in which one or more users are tasked with configuring multiple electronic devices 110, and may wish to be able to confirm at a glance which of the multiple electronic device 110 have already been configured.

In some embodiments, including embodiments in which the display 314 does not present a persistent indicator of whether configuration data has been stored in the configuration system 230, the display 314 may present the indication once the configuration data is properly stored within the configuration memory 236, and may also present the indication anew when subjected to a subsequent external EMF. Thus, a user may be able to confirm that configuration data has been properly stored within the configuration system 230, even whilst the electronic device is unpowered, by subjecting the electronic device 110 to a subsequent external EMF, from which the antenna 232 can harvest power. In response to this subsequent external EMF, the display 314 may present a subsequent indicator, using the power harvested by the antenna 232.

In some cases, the subsequent external EMF may be used to transmit, or may otherwise accompany, a query from a requesting device to the configuration system 230. The requesting device may be any suitable type of device capable of producing a suitable subsequent external EMF, and may be substantially similar to any of the devices uses to produce the original external EMF, used to power the configuration system 230 and provide the data stream from which the configuration data is extracted. The query may request various types of information from the configuration system 230, and the configuration system 230 may transmit a response via the antenna 232. In some embodiments, the response is generated by the configuration controller 238, using any suitable information at the disposal of the configuration controller 238, including the configuration data provided to the configuration system 230 and stored in the configuration memory 236. In some other embodiments, part or all of the response is included as part of the data stream by which the configuration data is obtained by the configuration system 230. Put differently, the data stream provided by the external device may include a pre-formulated response to be provided when queried regarding the nature of the configuration data, for example to reduce the amount of computation needed to be done by the configuration system 230, which may in turn reduce the amount of electrical power required to operate the configuration system 230.

The query may relate to a configuration status of the configuration system (i.e., has configuration data been stored in the configuration memory 236), to the nature of the configuration data stored in the configuration memory 236, to various characteristics of the configuration data, and the like. The configuration system 230, via the antenna 232, may transmit a response to the device which issued the query. In some embodiments, the response may include a confirmation relating to the configuration status of the electronic device, for instance "TRUE" to indicate the presence of configuration data in the configuration memory 236, or "FALSE" to indicate the absence of configuration data in the configuration memory 236. The response may include other information, depending on the query received by the configuration system 230, including part or all of any pre-formulated responses that may be stored in the configuration memory 236. For example, the response can include a hash of the configuration data, which may be digitally signed by the configuration system 230, copies of the various digital signatures which accompanied the configuration data, or the like, for validation by the device which issued the query. By way of another example, the response can include a copy of the configuration data itself. Other approaches are also considered.

With additional reference to FIG. 2, at some time following the storing of the configuration data (and any other relevant data) within the configuration memory 236 of the configuration system 230, the electronic device 110 may be powered on (that is to say, switched from the unpowered state to a powered state), such that the power source 224 can supply electrical power to the primary system 210 (and, in some embodiments, to the configuration system 230). This may occur as a result of the electronic device 110 being plugged in, for instance via a power cable, as a result of the electronic device 110 being switched on, for instance via a power switch forming part of (or otherwise being associated with) the power source 224, or in any other suitable fashion.

It should be noted that when the electronic device 110 is powered on, that is to say, supplied with power via the power source 224, part or all of the configuration system 230 may be powered by the power source 224. Thus, although the primary system 210 is unpowered when the electronic device 110 is unpowered, and is only powered via the power source 224, the configuration system 230 may be powered both via the power source 224 and when the antenna 232 is subjected to an external EMF with sufficient energy for harvesting to power the configuration memory 236 and/or the configuration controller 238.

As part of the powering on of the electronic device 110, the primary system 210 may execute a boot process which causes the primary controller 218 and the primary memory 216, as well as any other components of the primary system 210, to begin normal operation. The boot process may include loading of software into the primary controller 218, powering on of the primary memory 216, and the like. Additionally, upon the electronic device 110 being powered on, for instance as part of the boot process of the primary system 210, the primary system 210, for instance via the primary controller 218, may determine whether the configuration system 230, for instance the configuration memory 236, obtained configuration data whilst the electronic device 110 was unpowered.

From the perspective of the primary system 210, the presence of configuration data (and/or of other data) within the configuration system 230 represents a task to be performed by the primary system 210. The primary system 210, upon determining the presence of configuration data within the configuration system 230, takes a number of steps, described in greater detail hereinbelow, to complete said task. In some cases, the primary system 210, whether via the primary controller 218 or otherwise, issues a query to the configuration system 230 to determine the presence of configuration data. In some other cases, one or more components of the configuration system 230 issue a notification or similar communication to one or more components of the primary system 210 as part of the boot process to indicate to the primary system 210 that the configuration system 230 obtained configuration data whilst the electronic device 110 was unpowered. In some cases, the configuration system 230 receives multiple configuration data whilst unpowered, and each instance of configuration data may represent a separate task to be performed by the primary system 210.

As described hereinabove, in some embodiments, the primary controller 218 queries the configuration system 230, for instance the configuration memory 236, to determine whether or not configuration data is present therein The query may be sent from the primary system 210 (or from a component thereof) to the configuration system 230 (or to a component thereof) in any suitable fashion, using any suitable protocols and connections between the primary system 210 and the configuration system 230. The querying of the configuration memory 236 by the primary controller 218 may request confirmation regarding whether configuration data is present in the configuration memory 236, information regarding the characteristics of the configuration data, that the configuration memory 236 provide the configuration data to the primary controller 218, and the like. In embodiments in which the configuration system 230 includes the configuration controller 238, the configuration controller 238 mediates the queries to the configuration memory 236. For example, the queries from the primary controller 218 are received by the configuration controller 238, which can respond to the primary controller 218 with relevant responses based on the configuration data and other information stored in the configuration memory 236.

In some embodiments, the primary controller 218 may query the configuration system 230 to determine a presence of configuration data in the configuration memory 236. When the configuration memory 236 does store configuration data, the configuration system 230, for instance via the configuration controller 238, may respond to the primary controller 218 with a confirmation that configuration data is indeed present in the configuration memory 236. The primary controller 218 may then obtain the configuration data from the configuration memory 236, and cause the configuration data to be loaded in the primary memory 216. Although reference is made herein to the configuration data being loaded into the primary memory 216, it should be understood that other programmatic approaches are considered. For example, the configuration memory 236 is the location where the configuration of the electronic device 110 is stored, and the primary memory 216 is updated with a location or other relevant information indicative of where to obtain the configuration within the configuration memory 236. By way of another example, the primary memory 216 and the configuration memory 236 may each store part of the information relevant to the configuration of the electronic device 110. The primary controller 218 may also cause the electronic device 110 to operate in accordance with the configuration data obtained from the configuration memory. In embodiments in which the configuration controller 238 is a component of the configuration system 230, the configuration controller 238 may mediate the transfer of the configuration data from the configuration memory to the primary controller 218 and/or to the primary memory 216.

Additionally, in some embodiments, once the configuration data is provided from the configuration memory 236 to the primary controller 218 and/or to the primary memory 216, the configuration data may thereafter be removed or otherwise deleted from the configuration memory 236. This may be done to prevent the same configuration data from being used multiple times, to prevent an unauthorized third-party from obtaining the configuration data from the configuration memory 236, for instance via the antenna 232, or for any other suitable reason. In some cases, as part of the deleting process, the primary memory 216 and/or the configuration memory 236 may store a record of the presence of the configuration data for retention after deletion of the configuration data itself. For example, the record may include a hash of the configuration data, information about the source of the configuration data, any validation information included alongside the configuration data (e.g., a digital signature), or the like. This may ensure a degree of auditability of the configuration data provided to the configuration system 230, whilst ensuring that the configuration data is not reused or inappropriately accessed. Other approaches are also considered. For example, the configuration data may also be removed manually by an operator: an external device may be used to produce a subsequent EMF from which provides a command to the configuration system 230 instructing the configuration system 230 to clear the configuration memory 236. This may be useful in situations in which the incorrect configuration data was provided to the configuration system 230, or in which it is desired to return the electronic device 110 to a factory default state.

It should be noted that in some embodiments, including embodiments in which the configuration controller 238 is not included as part of the configuration system 230, the primary controller 218 may be configured to access the configuration memory 236 itself, without any mediation. For example, the configuration memory 236 may be accessible via a common bus or other communication vehicle to which the primary controller 218 is also connected. In this example, upon powering on of the electronic device 110, the primary controller 218 can query the configuration memory 236 over the bus to determine the presence of configuration data in the configuration memory 236.

When the configuration memory 236 does not store configuration data, the configuration system 230, for instance via the configuration controller 238, may respond to the primary controller 218 with an indication that no configuration data is present in the configuration memory 236. In some embodiments, when the primary controller 218 receives the indication that configuration data is absent from the configuration memory 236, the primary controller 218 then loads an alternative configuration data and causes the electronic device 110 to operate in accordance with the alternative configuration data. The alternative configuration data may be stored (e.g., have been previously stored) in the primary memory 216, or in the configuration memory 236, and may be the previous configuration data, that is to say, the configuration data already available to the electronic device 110, unaltered by the configuration data obtained by the configuration system 230 while the electronic device 110 was unpowered. In some other cases, the alternative configuration data may be a default configuration data, a backup configuration data, or the like. For example, the primary controller 218 may query the configuration memory 236 for configuration data. When the configuration memory 236 is found not to contain any configuration data, or the configuration controller 238 responds to the primary controller 218 with an indication of absence of configuration data, the primary controller 218 may obtain the alternative configuration data from the primary memory 216, then cause the electronic device 110 to operate in accordance with the alternative configuration data.

In some embodiments, once the configuration data is loaded into the primary memory 216, the primary controller 218 may communicate a message to a remote server, for instance over a network, indicating that the configuration data has been loaded, for instance over one of the interfaces 220. The message may include a confirmation that the configuration data has successfully been loaded, and indicate various characteristics of the configuration data, the source of the configuration data, the device which provided the configuration data, the user who transmitted the configuration data, and the like. In some cases, the identity of the remote server to which a message is to be sent is specified by the configuration data itself, for instance by including a universal resource identifier (URI), an internet protocol (IP) address, or the like.

The primary controller 218 may also acquire various other information from the configuration memory 236, in addition to determining the presence of the configuration data and obtaining the configuration data itself, when present. For example, the primary controller 218 can obtain information with which to perform validations of the configuration data. Various types of validations may be performed in any suitable order and at any suitable time. Once the primary controller 218 has performed the requisite validations to confirm that the configuration data is valid, the primary controller 218 may proceed as described hereinabove by loading the configuration data into the primary memory 216. The electronic device 110 is then operated in accordance with the configuration data.

One type of information used to validate the configuration data includes metadata for the configuration data. In some embodiments, the metadata includes one or more timestamps, which might indicate the time at which the configuration data was generated, the time at which the configuration data was transmitted to the electronic device 110, or any other suitable time. The primary controller 218 may obtain the timestamp(s) and decide whether to use the configuration data in the configuration memory 236 based thereon. In some embodiments, the primary controller 218 may be provided with predetermined rules regarding the age of configuration data which is permissible to use. For example, the primary controller 218 may have a rule against using configuration data older than 14 days, older than 30 days, older than 90 days, older than 1 year, or the like. The primary controller 218 may compare the timestamp of the configuration data against a current time to determine the age of the configuration data, prior to loading the configuration data into the primary memory 216, and only perform the loading when the configuration data is confirmed to be recent enough. In situations in which multiple configuration data are stored in the configuration memory, the primary controller 218 may compare timestamps of different configuration data to determine a most recent configuration data to load into the primary memory 216, load each of the configuration data in succession, or the like.

Another type of information that can be used to validate the configuration data includes digital signatures. In some embodiments, the configuration data is digitally signed when it is transmitted to the configuration system 230 for storage within the configuration memory 236. The digital signature(s) may include a digital signature associated with the source of the configuration data, a digital signature associated with the device transmitting the configuration data, and/or a digital signature associated with the user that requested or is performing the transmission of the configuration data to the configuration system 230. The digital signatures may be generated in any suitable fashion, for instance using the private keys of the signing entities, which may then be validated using the associated public keys of the signing entities (though other approaches are also considered). Other data included alongside the configuration data may also be signed, as appropriate: in some embodiments, metadata associated with the configuration data may also be digitally signed. For example, the metadata may include a signed hash of the configuration data. Upon obtaining the configuration data from the configuration memory, the primary controller 218 may compare a newly-obtained hash of the configuration data against the signed hash to ensure that the configuration data has not been tampered with. By way of another example, the metadata may include a signed timestamp or similar indicator, allowing the primary controller 218 to validate the timestamp before using it to determine whether to load the configuration data, as described hereinabove.

A further type of validation can be performed by determining whether the configuration data stored in the configuration memory 236 is appropriate for the electronic device 110. Put differently, the configuration data is assessed to determine whether or not the electronic device 110 is capable of operating in accordance with the configuration data, or whether the configuration data includes settings, parameters, or other aspects which are not suitable for the operation of the electronic device 110. In some embodiments, the configuration data includes an indication of the type of device on which it should be deployed on, and the primary controller 218 may validate the configuration data by comparing the indication of the type of device with a known type of the electronic device 110. In some other embodiments, the primary controller 218 is provided with a list of settings for which configuration details are expected, and when the configuration data is verified by the primary controller 218, the presence of extraneous configuration details, or the absence of essential configuration details, in the configuration data may be indicative of an unsuitable configuration data for the electronic device 110. Other approaches are also considered.

In the event that the attempts to validate the configuration data by the primary controller 218 are unsuccessful—for instance, one or more digital signatures are found to be invalid—the primary controller 218 may load alternative configuration data into the primary memory 216. The alternative configuration data may be a previous or existing configuration data, a default configuration data, a backup configuration data, or the like. In some cases, the primary controller 218 may have already loaded a configuration data into the primary memory 216, so that when the primary controller 218 is unable to validate the configuration data in the configuration memory 236, the primary controller 218 relies upon the already-loaded configuration data in the primary memory 216.

Figure 4:
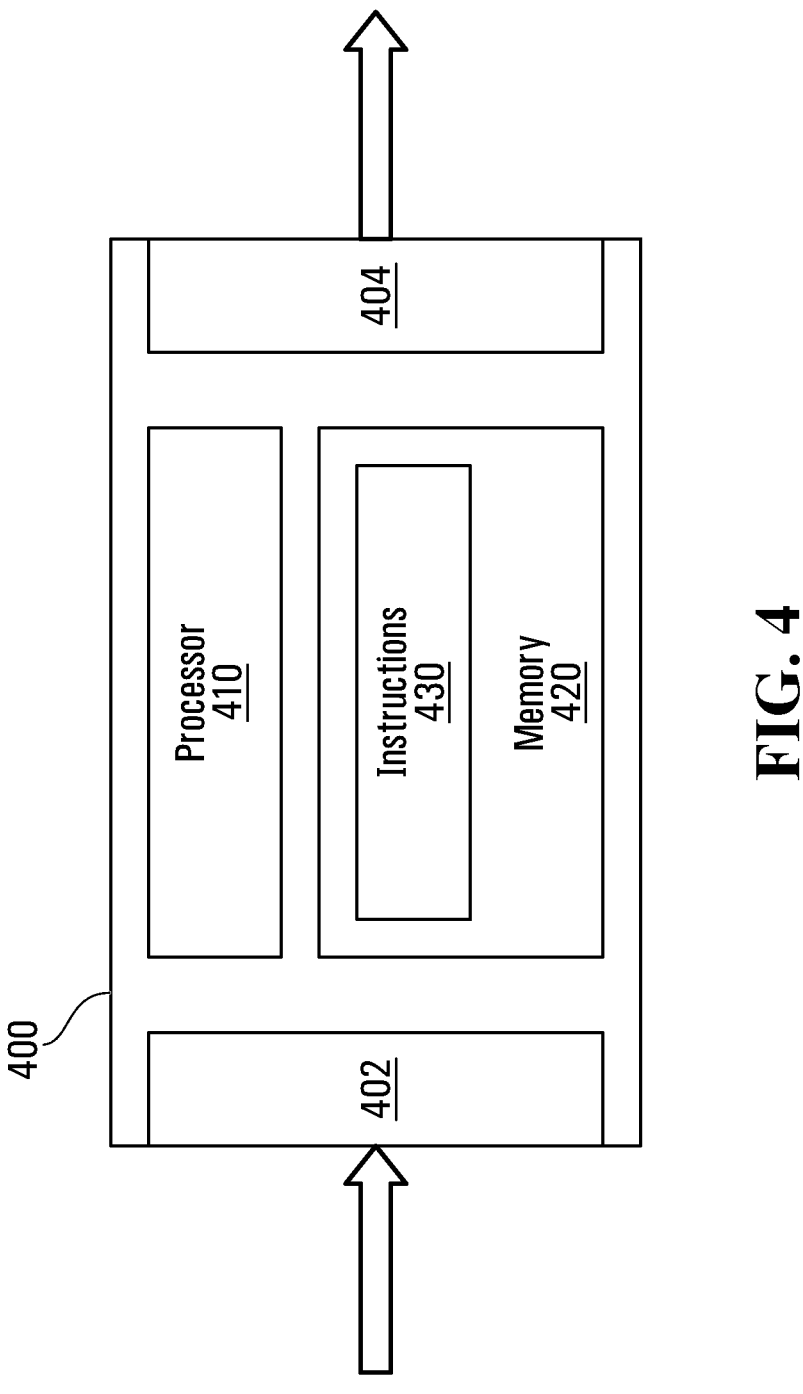
FIG. 4 is a block diagram of an example computing system.

With reference to FIG. 4, there is illustrated there is illustrated a schematic diagram of an example computing device 400. As depicted, the computing device 400 includes at least one processor 410, a memory 420, and program instructions 430 stored within the memory 420, as well as input and output interfaces (I/O interfaces) 402 and 404, respectively. For simplicity, only one computing device 400 is shown; the electronic device 110, as well as the device which produces the external EMF, the remote server with which the electronic device 110 may communicate, and the like, may be embodied by one or more implementations of the computing device 400. The computing devices 400 may be the same or different types of devices. The components of the computing device 400 may be connected in various ways including directly coupled, indirectly coupled via a network, and distributed over a wide geographic area and connected via a network, for instance via a cloud computing implementation.

The I/O interfaces 402, 404 may include one or more media interfaces, via which removable media or other data sources may be coupled, one or more network interfaces, or any other suitable type of interface. The I/O interfaces 402, 404 of the computing device 400 may additionally, in some embodiments, provide interconnection functionality to one or more input devices, such as a keyboard, mouse, camera, touch screen and a microphone, with one or more output devices such as a display screen and a speaker, and/or with other types of devices which are not limited to providing input or receiving output; for instance, the I/O interfaces 402, 404 may embody those devices described as forming the interfaces 220. In embodiments in which the I/O interfaces 402, 404 include one or more network interfaces, the network interface(s) of the computing device 400 may enable the computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The processor 410 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The memory 420 may include a suitable combination of any type of computer memory that is located either internally or externally such as, for example, random-access memory (RAM), read-only memory (ROM), compact disc read-only memory (CD-ROM), electro-optical memory, magneto-optical memory, erasable programmable read-only memory (EPROM), and electrically erasable programmable read-only memory (EE-PROM), Ferroelectric RAM (FRAM) or the like.

In certain embodiments, the computing device 400 is operable to register and authenticate users (using a login, unique identifier, and password for example) prior to providing access to applications, a local network, network resources, other networks, and network security devices. The computing device 400 may serve one user or multiple users.

For example, and without limitation, the computing device 400 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and/or implementing the systems described herein.

Figure 5:
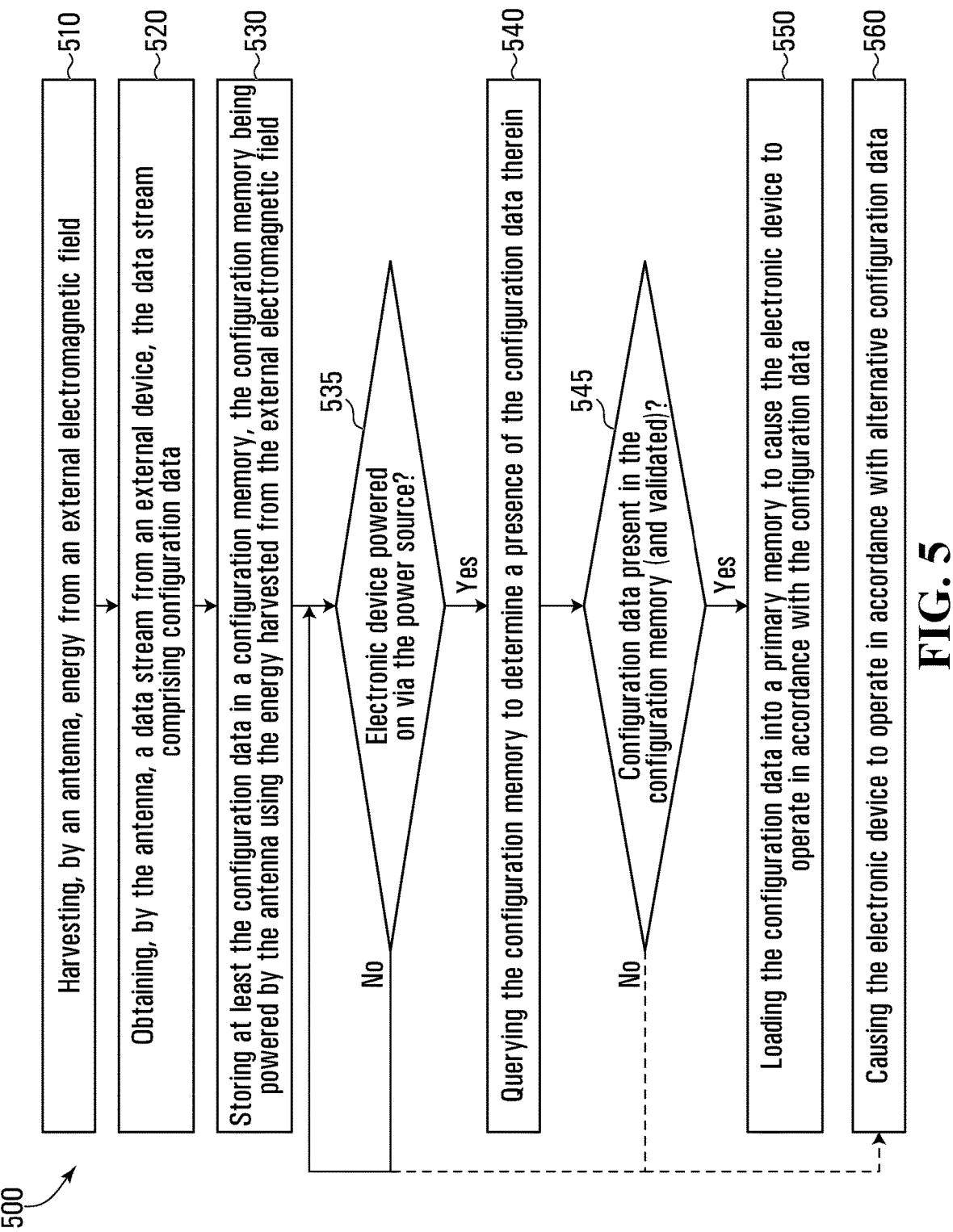
FIG. 5 is a flowchart illustrating an example method for configuring a configurable electronic device.

With reference to FIG. 5, there is illustrated a flowchart of an example method for configuring a configurable electronic device, for instance the electronic device 110. As described hereinabove, the electronic device 110 includes a primary memory (e.g., the primary memory 216) powerable by a power source (e.g., the power source 224) which is coupled to the primary memory 216, a configuration memory (e.g., the configuration memory 236) which is separate from the primary memory 216, an antenna (e.g., the antenna 232) which is coupled to the configuration memory 236, and a primary controller (e.g., the primary controller 218) which is powerable by the power source 224, and which is coupled to the primary memory 216 and the configuration memory 236.

As part of step 510, the method 500 comprises harvesting, by the antenna 232, energy from an external EMF. The external EMF may be produced by any suitable type of device separate from the electronic device 110. The antenna 232 may harvest any suitable amount of energy, and use it to power other elements of the electronic device 110, for instance those described hereinabove as forming part of the configuration system 230. The harvesting of the energy by the antenna 232 occurs only so long as the antenna 232 is subjected to external EMF; however, in embodiments in which the configuration system 230 includes energy storage devices, such as capacitors or the like, the elements of the configuration system 230 may be powered for longer than the duration that the antenna 232 is subjected to external EMF.

As part of step 520, the method 500 comprises obtaining, by the antenna 232, a data stream from an external device, the data stream comprising configuration data. The external device which provides the data stream to the antenna 232 may be the same external device which provides the external EMF, or may be a different external device, as appropriate. The data stream may be provided to the antenna 232 in any suitable format, at any suitable bitrate, and the like; in some embodiments, the data stream may be a digital data stream, whereas in other embodiments, it may be an analog data stream, which may then be decoded by the antenna 232 and/or other elements of the configuration system 230, for instance the configuration controller 238. The data stream may be composed primarily of the configuration data, though other data may also be included in the data stream: for example, the data stream may also include metadata relating to the configuration data.

As part of step 530, the method 500 comprises storing at least the configuration data in the configuration memory 236, the configuration memory 236 being powered by the antenna 232 using the energy harvested from the external EMF. In some embodiments, the configuration memory 236, as well as any other suitable elements of the configuration system 230, are powered substantially completely by the energy harvested from the external EMF, whereas in some other embodiments, the configuration memory 236, as well as any other elements of the configuration system 230, are powered in part by the energy harvested from the external EMF and in part by a power source separate from the power source 224, for instance a battery or the like.

As part of decision step 535, the method 500 comprises determining whether the electronic device 110 has been powered on, for instance via the power source 224. When the electronic device 100 has been powered on, the method 500 proceeds to step 540. When the electronic device 110 has not been powered on, the method 500 returns to some previous step, for instance back to the start of decision step 535 to evaluate anew whether the electronic device 110 has been powered on. Thus, the method 500 may stay at decision step 535 until the electronic device 110 is powered on, for instance via the power source 224.

As part of step 540, upon powering on of the electronic device 110, the method 500 comprises querying the configuration memory 236 to determine a presence of the configuration data in the configuration memory 236. The query may be sent from the primary controller 218, or any other suitable element of the primary system 210, which is powered on via the power source 224, and may be issued in any suitable format. In some embodiments, the query may request additional information regarding the configuration data in the configuration memory 236. In some other embodiments, the query is limited to determining the presence of the configuration data in the configuration memory 236, and if a confirmation is received from the configuration system 230, the primary system 210 may send a follow-up query to request additional information regarding the configuration data in the configuration memory 236. In both cases, the primary system 210, for instance via the primary controller 218, may request various types of additional information, including metadata relating to the configuration data, for instance digital signatures applied to the configuration data, timestamps associated with the configuration data, and the like.

As part of decision step 545, the method 500 comprises determining whether configuration data is present in the configuration memory 236. In some embodiments, decision step 545 also comprises validating the configuration data, or determining whether the configuration data has been validated. When the configuration data is present in the configuration memory 236, and, in some cases, when the configuration data has been validated, the method 500 moves to step 550. When the configuration data is not present in the configuration memory 236, or when the configuration data is not valid, or has otherwise not been validated, the method 500 may move to step 560, or may return to some previous step, for instance back to the start of decision step 535 to evaluate anew whether the electronic device 110 has been powered on. In this fashion, queries to the configuration system 230 to determine whether configuration data is present in the configuration memory 236 occur only when the electronic device 110 is powered on. In some other embodiments, the method 500 may return to a different step, for instance to step 540, to query anew the configuration memory to determine whether configuration data is present therein. Any suitable delay may be applied prior to returning to the various steps of the method 500, however; for instance, step 540 may be performed periodically, in response to certain triggers, or the like. For instance, in response to the electronic device 110 being powered off, there may be an expectation that new configuration data will be supplied to the configuration memory 236, via steps 510-530 being performed. Thus, the method 500 may be repeated multiple times for a single electronic device 110, as appropriate.

In embodiments in which the configuration data is validated as part of decision step 545, or in which it is determined whether the configuration data has been validated, the validation may be performed in various ways. The validation may include verifying one or more digital signatures associated with the configuration data, one or more hashes of the configuration data, and the like. In some embodiments, the validation is performed by an element of the primary system 210, for instance the primary controller 218, as part of the querying of the configuration memory 236 to determine the presence of the configuration data therein. For example, the primary controller 218 may first query the configuration memory 236 to determine whether the configuration memory 236 has configuration data stored therein, and in the affirmative case, may then query the configuration memory 236 for various related data (e.g., metadata) for use in validating the configuration data, including digital signatures and the like. In some other embodiments, the validation is performed by an element of the configuration system 230, for instance the configuration controller 238. By way of an example, the configuration controller 238 is configured for validating the configuration data when the configuration data is obtained (as part of step 520) and/or when the configuration data is stored in the configuration memory 236 (as part of step 530). The configuration controller 238 can store validation information relating to the configuration data in the configuration memory 236 in association with the configuration data for later evaluation, for instance by the primary controller 218. By way of another example, the configuration controller 238 is configured for validating the configuration data when the configuration data is requested by the primary system 210 (as part of step 540 and/or step 550). Once the validation is performed by the configuration controller 238, the configuration controller 238 can provide validation results to the primary controller 218 (which may then decline to load the configuration data in the event of a failed validation), or may store the validation results in association with the configuration data, which may then be evaluated by the primary controller 218.

As part of step 550, the method 500 comprises, responsive to determining the presence of the configuration data in the configuration memory 236, loading the configuration data into the primary memory 216 to cause the electronic device 110 to operate in accordance with the configuration data. The configuration data may be loaded into the primary memory 216 via the primary controller 218, via the configuration controller 238, or via any other suitable element (s) of the primary system 210 and/or the configuration system 230. By way of an example, the primary controller 218 instructs the configuration memory 236 to place the configuration data on a bus linking the primary system and the configuration system. The primary memory 216 can then obtain the configuration data from the bus for storage. By way of another example, the configuration controller 238 instructs the configuration memory 236 to place the configuration data on the aforementioned bus, and the primary controller 218 instructs the primary memory 216 to obtain the configuration data therefrom. Other approaches are also considered. In some embodiments, step 550 is only performed responsive to determining the presence of the configuration data in the configuration memory 236 and to validating the configuration data present in the configuration memory 236.

The primary memory 216 may store the configuration data therein in any suitable fashion. In some embodiments, the configuration data obtained from the configuration memory 236 is stored in the primary memory 216 alongside other configuration-related information. By way of an example, the primary memory 216 also stores the metadata associated with the configuration data, the results of any validation of the configuration memory, and the like, for instance for auditing purposes. By way of another example, the primary memory 216 also stores other configuration data, for instance backup configuration data, default configuration data, one or more sets of past configuration data, and the like. In addition, in some embodiments, once the configuration data is loaded into the primary memory 216, the configuration data may be removed or otherwise deleted from the configuration memory 236, for instance to avoid the same set of configuration data being accessed at a later date.

Once the configuration data is loaded into the primary memory 216, the configuration data can be used as part of the operation of the electronic device 110 in any suitable fashion. By way of an example, the configuration data specifies the location to which the electronic device 110 is to send audit logs for evaluation by an outside party. By way of another example, the configuration data specifies the identities of a number of other devices with which the electronic device 110 is to communicate, the protocols and authentication information to be used in communication with the other devices, and the like. By way of a further example, the configuration data specifies various authentication information and certificates that the electronic devices is to use to connect to one or more networks. The configuration data may specify any other suitable type of information in any number of other scenarios and embodiments, as appropriate.

In this fashion, the electronic device 110 can be configured whilst unpowered, and the configuration data can be loaded by the electronic device 110 once it is powered on, provided it is properly validated, where appropriate. This may allow for the electronic device 110 to be configured by a user different from the end-user, which may facilitate adoption by the end-user, ensure that sensitive information is not otherwise available to the end-user, and the like. Moreover, as is discussed in detail herein, this approach may enable the electronic device 110 to be configured while still its packaging or similar container used for transport, which may render the configuration transparent to the eventual end-user; that is to say, the electronic device 110 may be configured without it being known to the end-user.

Throughout the present discussion, reference has been made to "configuration data", "configuration file", and the like (referred to generically as "configuration data"). It should be understood that the particular programmatical implementations of the configuration data may vary from one implementation to another without departing from the present disclosure. For example, the configuration data provided to the electronic device 110 via the data stream (and then stored in the configuration memory 236) is a collection of requested changes (i.e., deltas) to be made to the existing configuration of the electronic device. In this example, the configuration data specifies a subset of parameters or other elements of the configuration to be changed, as well as the values to which the parameters should be set. By way of another example, the configuration data provided to the electronic device 110 via the data stream (and then stored in the configuration memory 236) is a complete set of configuration data, identifying all parameters and relevant values therefor. In this example, the configuration data is used to replace substantially all of any existing configuration of the electronic device 110. In some cases, the configuration data does not necessary result in substantive changes to the behaviour or operation of the electronic device (once powered on), even though any previous configuration of the electronic device 110 is replaced by the configuration data stored in the configuration memory 236. Other approaches are also considered. Regardless of the particular programmatical implementations, validation of the configuration data may be performed as appropriate, and the configuration data may be rejected—and thus, not loaded—if validation fails.

Figure 6A:
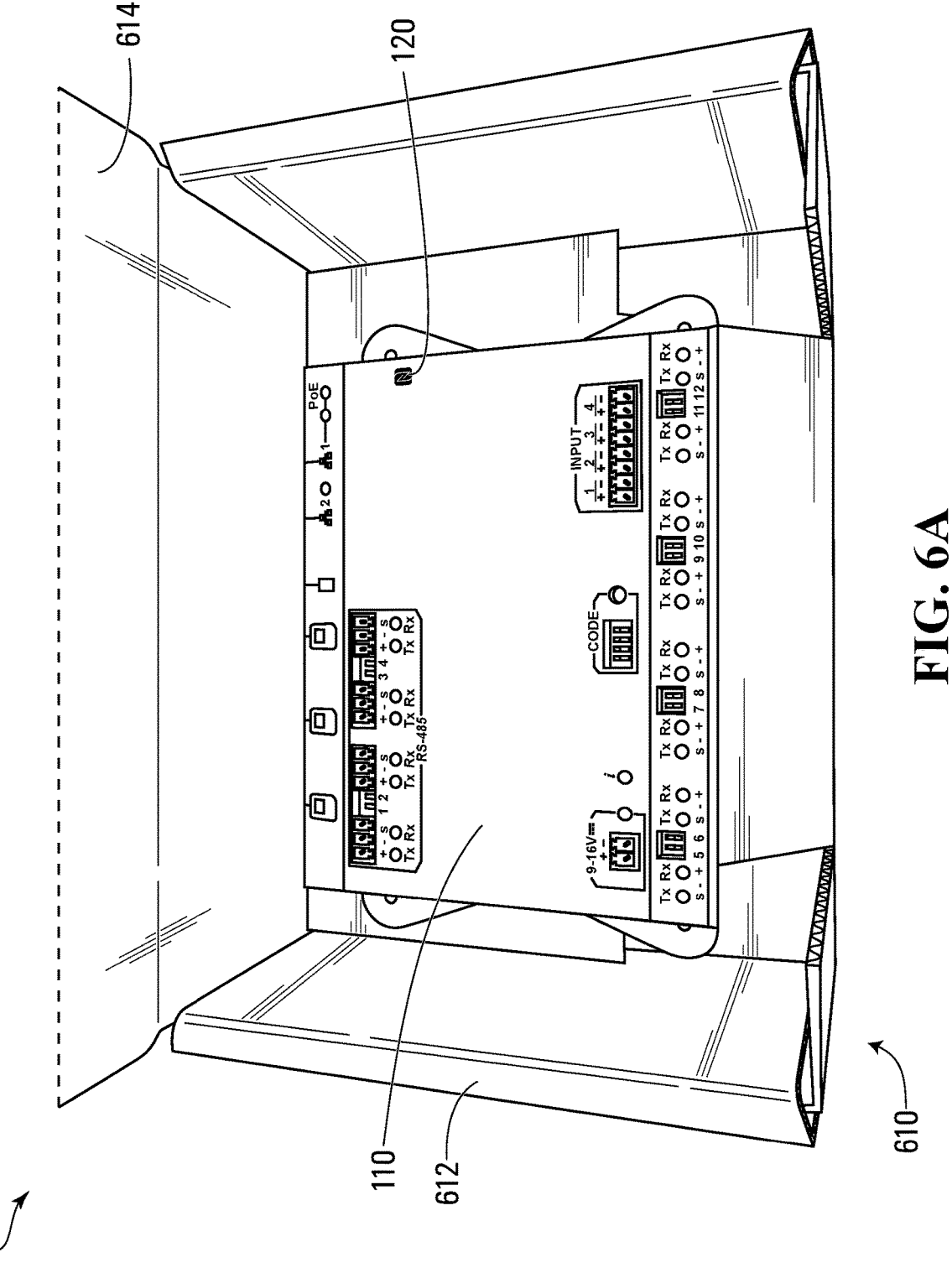
FIGS. 6A-C are schematic diagrams of an electronic device product, including the electronic device of FIG. 1.
Figure 6B:
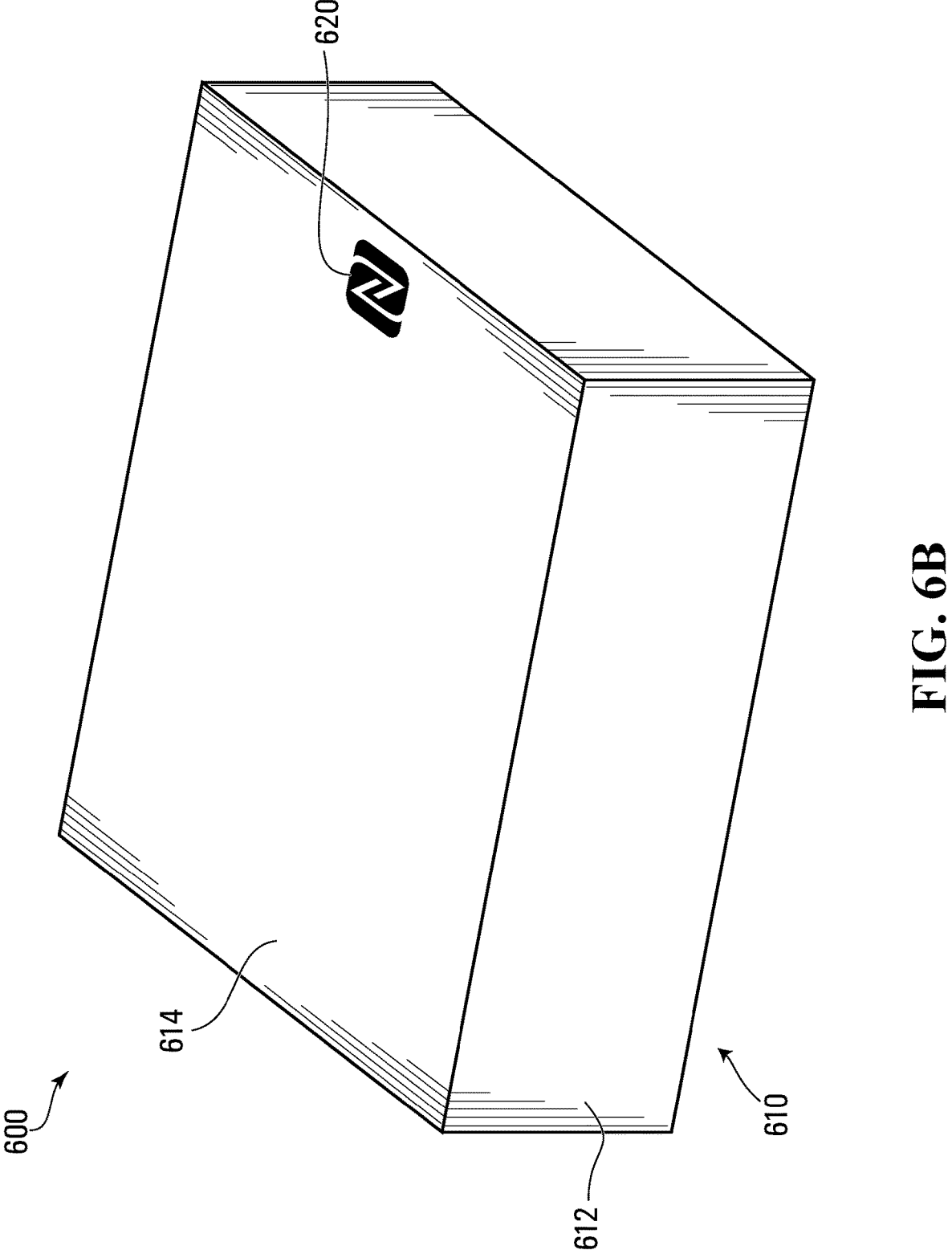

With reference to FIG. 6A-B, there is illustrated an electronic device product 600, which is composed of the electronic device 110 and a packaging 610. The packaging 610 comprises a main enclosure 612, which removably retains therein the electronic device 110. The main enclosure 612 may have any suitable shape and size, and may enclose therein any suitable portion of the electronic device 110. In FIG. 6A, a flap portion 614 of the main enclosure is shown in a raised position, which allows the electronic device 110 to be visible within the main enclosure 612; raising the flap portion 614 may also enable the electronic device 110 to be disposed within and removed from the packaging 610, though other approaches by which the electronic device 110 can be enclosed within the packaging 610 are also considered. In FIG. 6B, the flap portion 614 is shown in a lowered position, such that the main enclosure 612 substantially encloses the whole of the electronic device 110. However, in other embodiments, the main enclosure 612 of the packaging 610 may enclose only a portion of the electronic device, as appropriate. Additionally, in some embodiments, part or all of the antenna 232 may be integrated in or otherwise provided within the packaging 610. For example, at least a portion of an antenna may be integrally formed within the packaging 610, or otherwise disposed therein, and may be coupled to the electronic device 110 via one of the interfaces 220. In this fashion, the electronic device 110 may be configurable (in the unpowered state) when received within the packaging 610, but not configurable (in the unpowered state) when removed from within the packaging 610, as the portion of the antenna within the packaging 610 is no longer connected to the electronic device 110. In this example, a substitute antenna may be connectable to the electronic device 110 for configuration in the unpowered state when removed from the packaging 610, for instance by a user tasked with configuring the electronic device 110.

The main enclosure 612, as well as the packaging 610 as a whole, may be composed of any suitable material or combination of materials, though at least part of the main enclosure 612 is composed of a material which is transparent to the external EMF described hereinabove, which can be applied to the electronic device 110 for configuring the electronic device 110 when in an unpowered state. Additionally, a visual indicia 620 is born on an outward-facing surface of the main enclosure 612. The visual indicia 620 may be similar to the visual indicia 120 born on the outer surface of the housing 112 of the electronic device 110, or may be different therefrom in any suitable way. Irrespective of the particular implementation of the visual indicia 620, the visual indicia 620 is indicative of the location for applying the external EMF to the electronic device 110 in order to facilitate configuration of the electronic device 110 while in an unpowered state. Because both the visual indicia 120 and the visual indica 620 serve to indicate the same location (i.e., a location from which the external EMF can be applied to the electronic device 110 to configure the electronic device 110), the visual indicia 620 is disposed in proximity to the visual indicia 120 when the electronic device 110 is received within the packaging 610. For example, when the electronic device 110 is received within the packaging 610, the visual indicia 620 overlaps, in whole or in part, the visual indica 120. By way of another example, the visual indicia 620 may be juxtaposed, aligned with, adjacent to, or otherwise arranged to be proximate to the visual indica 120, when the electronic device 110 is received within the packaging 610. By way of a further example, when the electronic device 110 is received within the packaging 610, the visual indicia 620 may be substantially superposed over the visual indicia 120. Other arrangements are also considered.

In some embodiments, the entirety, or substantially the entirety, of the main enclosure 612 is composed of one or more materials that are transparent to the external EMF (i.e., the main enclosure 612 is composed entirely of one or more materials transparent to the external EMF). This may include materials which result in no noticeable attenuation to the external EMF, or which result in an insignificant amount of attenuation, such that the external EMF can be applied to the electronic device 110 through the packaging 610 (i.e., from the outside of the packaging 610 to the electronic device 110 retained therein). In some other embodiments, parts of the main enclosure 612 are composed of one or more materials that are not transparent to the external EMF, that is to say, which attenuate or substantially block the transmission of the external EMF. By way of an example, in embodiments in which the main enclosure 612 takes the shape of a box with six sides, one or more of the side panels of the main enclosure 612 and/or the bottom panel of the main enclosure 612 may be composed of materials that are not transparent to the external EMF. This may reduce the risk of accidentally applying the same external EMF to multiple electronic devices 110, which may be stacked together in their respective packaging 610. By way of another example, in some embodiments, a single packaging 610 may be used to retain therein multiple electronic devices 110, which may each have a respective location for applying an external EMF for configuring the electronic devices 110. In this example, only portions of the main enclosure 612 which are proximate to the location—for instance, the portions of the main enclosure which bear the visual indicia 620—are transparent to the external EMF, to reduce the risk of an external EMF applied to one of the locations accidentally applying to the second location, and thus to both electronic devices 110.

Figure 6C:
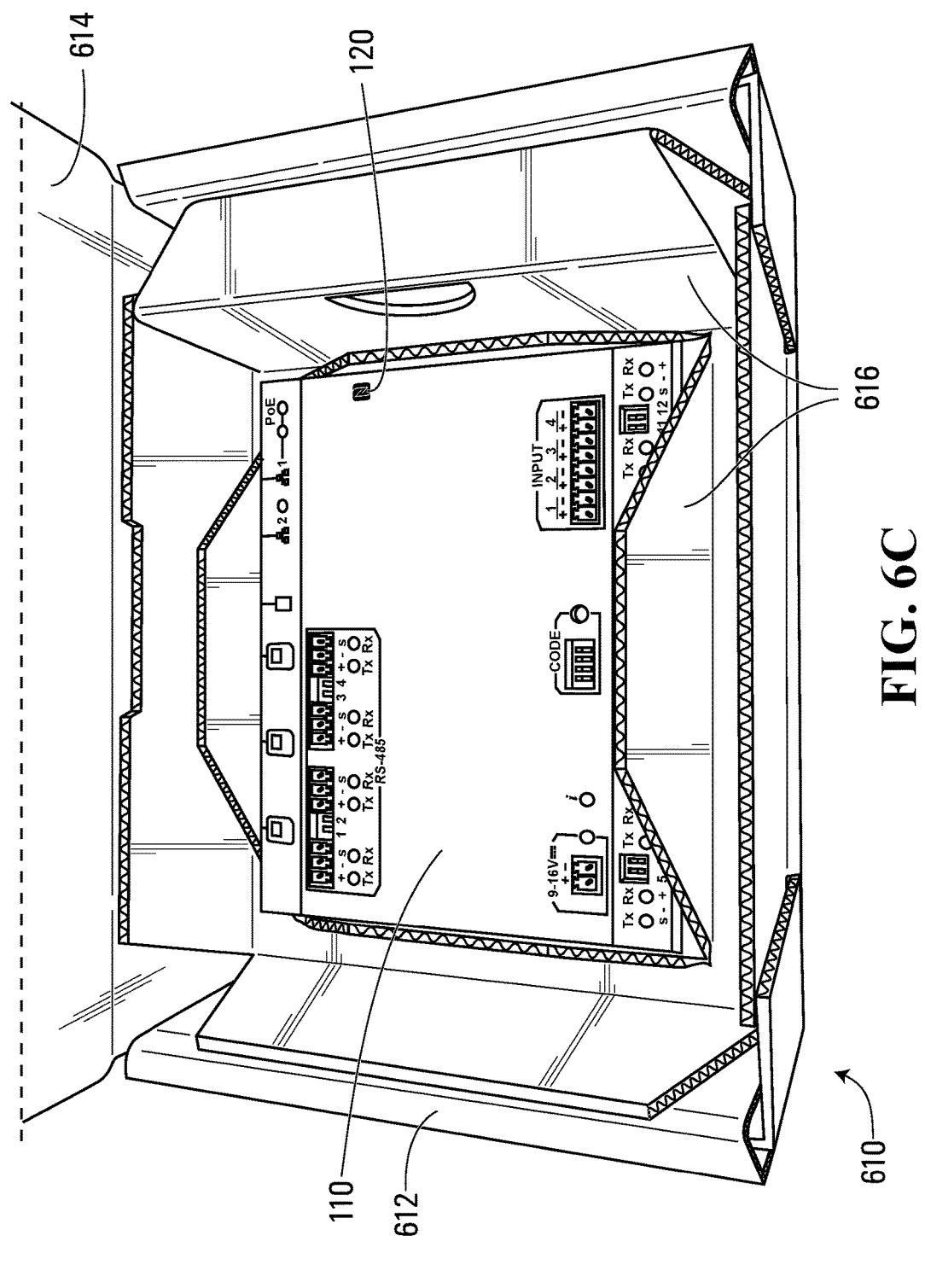

With additional reference to FIG. 6C, in some embodiments the packaging 610 includes a brace 616 which is disposed within the main enclosure 612 for removably securing the electronic device within the main enclosure 612. The brace 616 may form part of the main enclosure 612, or may be separate therefrom, for instance being removable from the main enclosure 612. In some such cases, when packaging the electronic device 110, the electronic device 110 may first be secured within the brace 616, then the brace 616 and the electronic device 110 are together placed within the main enclosure 612 for being retained therein. The brace 616 may be composed of any suitable material, which may or may not be transparent to the external EMF, as appropriate, for instance to ensure that the external EMF can only be applied for configuring the electronic device 110 from a particular location. In some embodiments, the brace 616 also enforces a pose on the electronic device 110 within the main enclosure 612. The pose enforced on the electronic device may involve ensuring a particular position and/or a particular orientation on the electronic device 110 when received within the main enclosure 612. For example, when the brace 616 secures the electronic device 110, the electronic device 110 may be limited in how it can be received within the main enclosure 612, for instance to a single position and/or orientation. This single position and/or orientation may ensure that, when the electronic device 110 is received within the main enclosure 612, the visual indicia 120 is disposed proximate the visual indicia 620, and thus that the location for applying the external EMF to the electronic device 110 is substantially collocated with the location for applying the external EMF to the packaging 610.

Figure 7A:
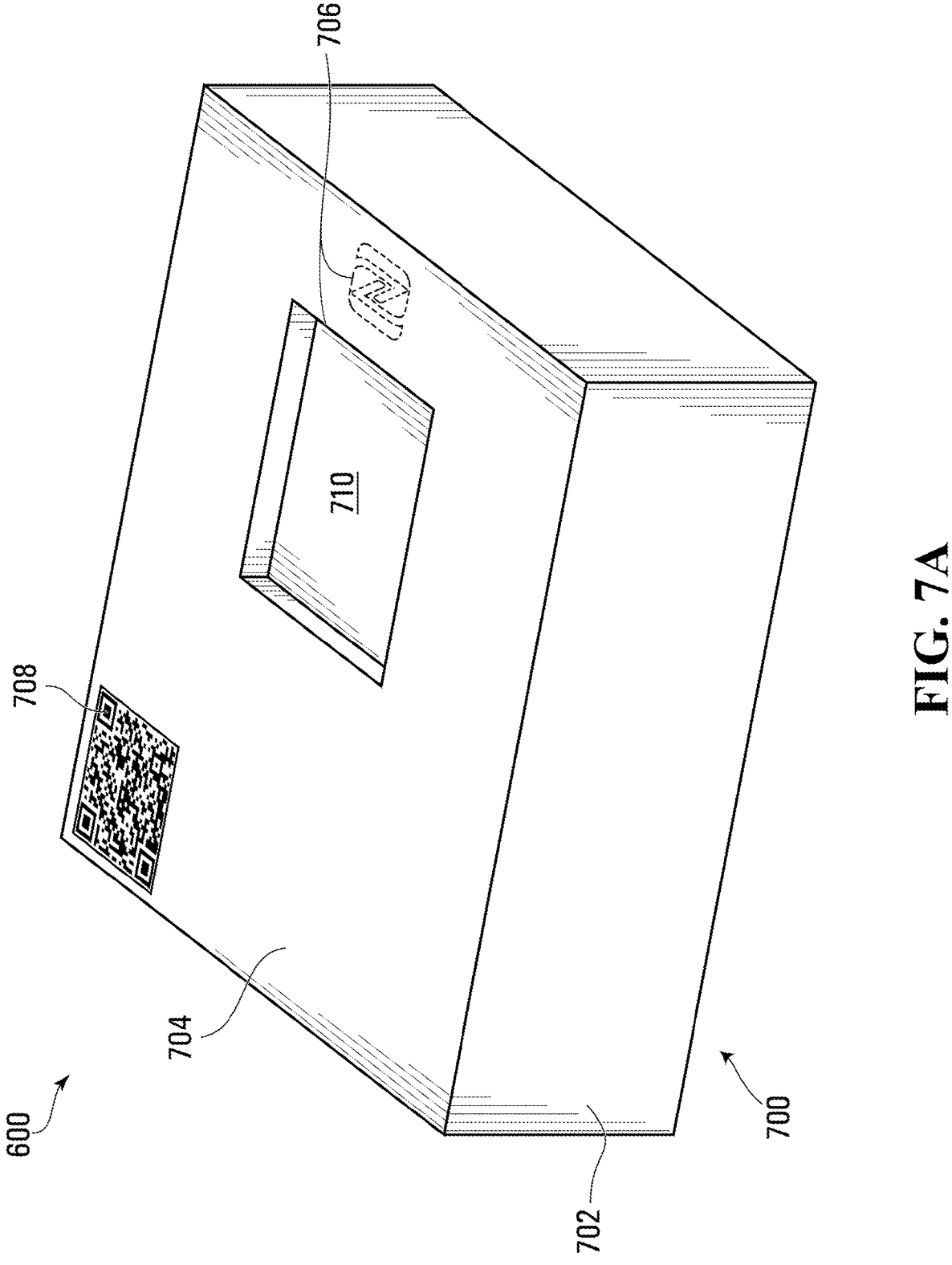
FIGS. 7A-C are schematic diagrams of variants of the electronic device product of FIG. 6.

With reference to FIG. 7A, the electronic device product 600 is illustrated as including an alternative packaging 700, composed of a main enclosure 702, within which the electronic device 110 is retained, and flap portion 704. The packaging 700 includes one or more printed unique resource locators (URLs) 708 born on the main enclosure 702. The printed URL 708 presents, stores, or otherwise provides information which indicates a target address at which an application associated with the electronic device 110 is obtainable. In some embodiments, the application is used for performing the configuring of the electronic device 110 while in the unpowered state, though in other embodiments, the application may be used for other purposes, such as controlling the electronic device 110, exchanging information with the electronic device 110 when powered on, and the like. The printed URL 708 may take any suitable visual form, including a web address, a bar code, a QR (quick response) code, any other suitable type of visual code, or the like, and may be born on any suitable portion of the main enclosure 702, as appropriate.

In the illustrated embodiment of FIG. 7A, the packaging 700 also includes one or more visual indica 706, which are indicative of the location at which the external EMF can be applied to perform configuration of the electronic device 110 while the electronic device is in an unpowered state. In some cases, the main enclosure 702 defines an indentation 710 in an outward-facing surface thereof, for instance in the flap portion 704, which serves as the visual indicia 706. The indentation 710 is shaped and positioned to removably receive an external device which produces the external EMF used to perform the configuration of the electronic device 110 while in the unpowered state. The indentation 710 may be of any suitable shape and size, depending on the type of external device used to produce the external EMF. In some embodiments, part or all of the main enclosure 702 in which the indentation 710 is defined may be of a different material than part or all of a remainder of the packaging 700. For example, part or all of the indentation 710 may be made of a material which is transparent visually, as well as to the external EMF, for instance a transparent plastic or the like. In some cases, the visual indicia 120 born on the electronic device 110 is visible through the visually transparent portion of the indentation 710.

In addition, the indentation 710 may be located at any suitable position within the main enclosure 702 which facilitates the transmission of the external EMF from the external device to the electronic device 110 when received within the packaging 700. In some embodiments, the indentation 710 is located proximate to another visual indicia 706, which may resemble the visual indicia 620 illustrated in FIG. 6B. For example, the indentation 710 is located such that the other visual indicia 706 is beside the indentation 710, such that the other visual indicia 706 is juxtaposed to the indentation 710, and the like. In some other embodiments, the other visual indicia 706 may be disposed, wholly or in part, within the indentation 710. For instance, the other visual indicia 706 may be composed of printed indications to illustrate or instruct on how to position the external device within the indentation 710, which may be located, in whole or in part, within the indentation 710. In some further embodiments, the other visual indica 706 disposed on the main enclosure 702 comprises, at least in part, the indentation 710 itself. Put differently, rather than, or in addition to, including the other visual indicia 706 (e.g., resembling the visual indica 620), the indentation 710 itself serves as the visual indicia indicative of the location for applying the external electromagnetic field to the electronic device.

Figure 7B:
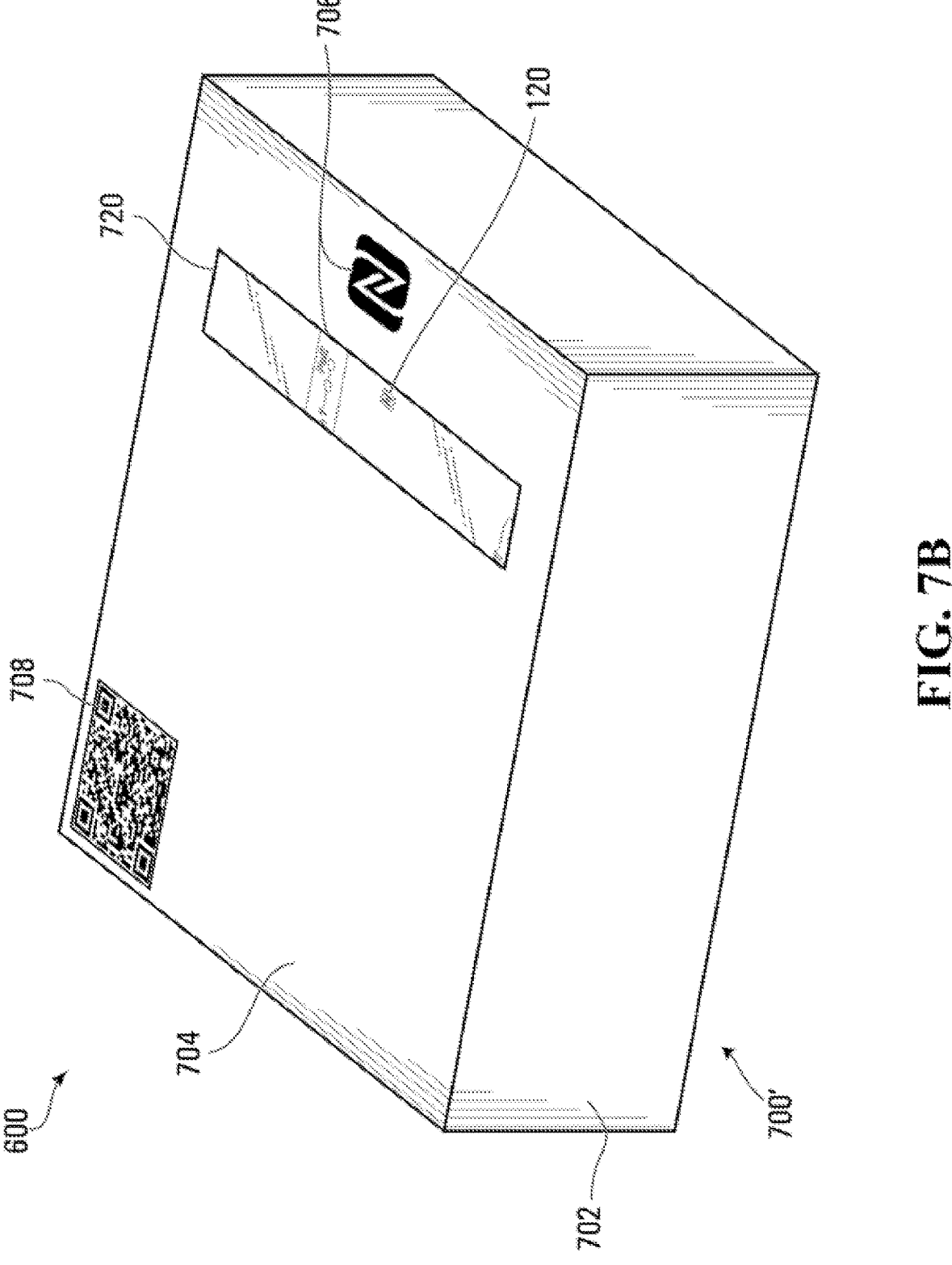

With reference to FIG. 7B, another alternative packaging 700' is illustrated. Instead of the indentation 710, the packaging 700' includes a portion of the main enclosure 702 which is composed of a material different from that which composes a remainder of the main enclosure 702, referred to herein as a window 720. The window 720 may be composed of any suitable material, including materials which are transparent to the external EMF. In one example implementation, the window 720 may be the only portion of the main enclosure 702 which is transparent to the external EMF, with the remainder of the main enclosure 702 attenuating or otherwise blocking the external EMF. In some embodiments, the material composing the window 720 is also transparent visually, such that the visual indicia 120 is visible through the window 720. In some embodiments, 'the window 720 serves as the visual indicia 706 indicative of the location for applying the external EMF. In some other embodiments, the packaging 700' additionally includes another visual indicia 706, which may resemble the visual indicia 620 illustrated in FIG. 6B. The other visual indicia 706 may be juxtaposed to, partially or wholly overlapping with, aligned with, or otherwise proximate to the window 720, to indicate the location at which the external EMF is to be applied for configuring the electronic device 110 when received within the packaging 700'.

As with the embodiment described hereinabove in relation to FIG. 7A, the visibility of the visual indicia 120 through the window 720 or other transparent portion of the main enclosure 702 may facilitate the understanding of a user responsible for applying the external EMF to the electronic device 110 on how best to position the external device. Thus, in some embodiments, including at least some of the embodiments discussed in conjunction with FIGS. 7A and 7B, the visual indicia 706 born on the main enclosure 702—whether resembling the visual indicia 620, as the indentation 710, and/or as the window 720—may overlap, in whole or in part, with the visual indicia 120 born on the electronic device 110, when the electronic device is received within the packaging 700, 700'. Additionally, depending on the metes and bounds of the location at which the external EMF is to be applied—that is to say, depending on the distance from which the external EMF can be used to power and transmit data to the electronic device 110 (which may also depend on the strength of the device producing the external EMF)—the distance between the various visual indicia 120, 706 can vary. It should be understood that the visual indicia 120 of the electronic device, as well as the visual indicia 706 of the packaging 700, 700' (and/or of any other packaging) need not be overlapping or in contact with one another in order to properly indicate the location for applying the external EMF. Indeed, the location at which the external EMF is to be applied may be sufficiently large as to encompass multiple visual indicia 706 located proximate to one another, as well as the visual indicia 120 of the electronic device 110.

Figure 7C:
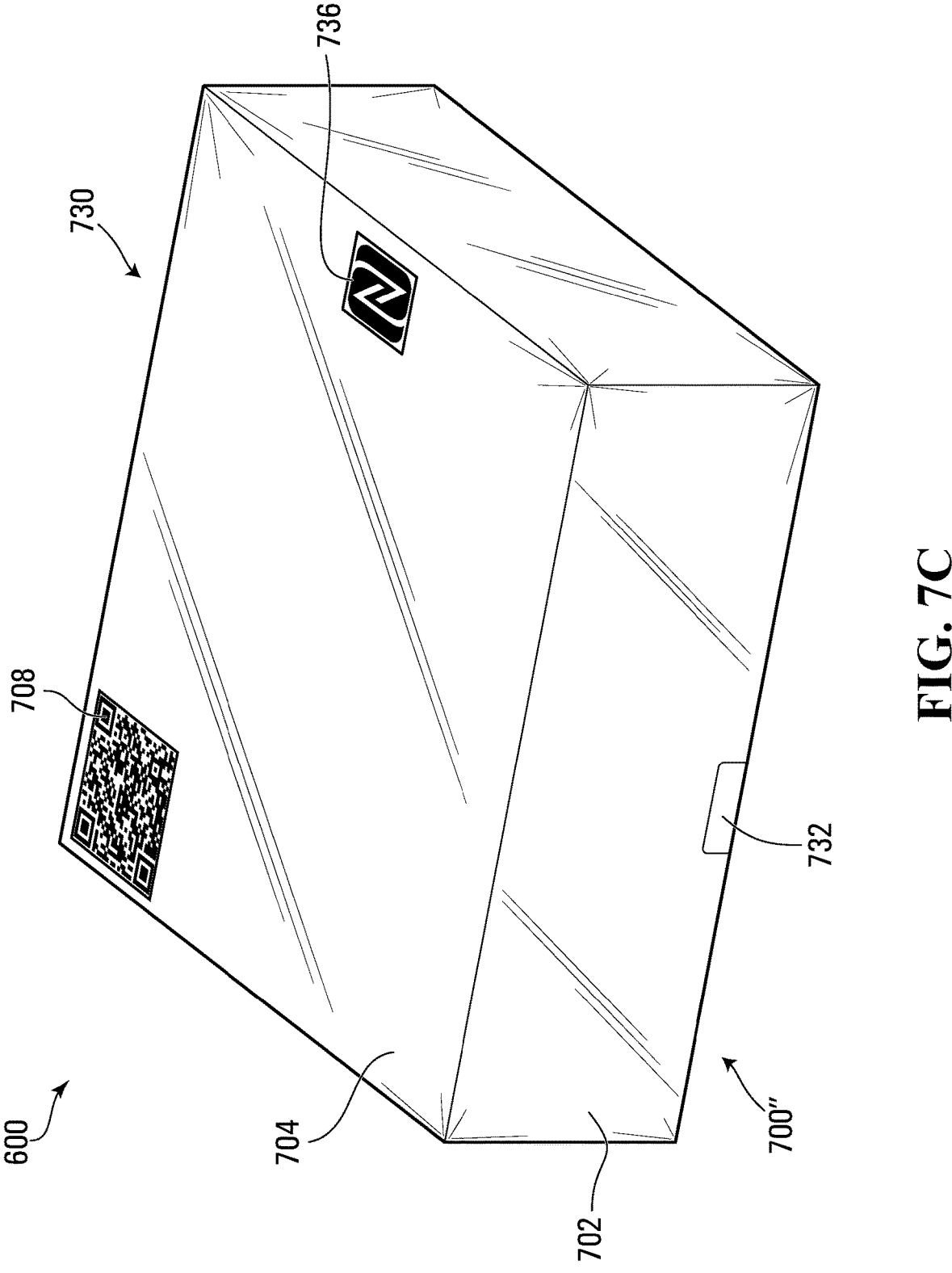

With reference to FIG. 7C, a further alternative packaging 700" is illustrated as additionally including seals 730, 732. Although two seals 730, 732 are illustrated in FIG. 7C, it should be understood that the packaging 700" may include any suitable number and type of seal elements. The seal 730 substantially envelops the entirety of the packaging 700", ensuring that the main enclosure 702 cannot be opened without first breaking the seal 730, thereby securely retaining the electronic device 110 therein. For example, the seal 730 may be a type of shrink wrap or similar seal which is applied to substantially the entirety of the packaging 700". In some embodiments, the seal 730 is transparent to the external EMF, such that the electronic device 110 can be configured while inside the packaging 700", which may further render the configuration of the electronic device 110 transparent to the end-user. Additionally, in some embodiments, the seal 730 may bear a visual indicia 736, which is indicative of the location for applying the external EMF to the electronic device 110. The visual indicia 736 may be applied to the seal 730 in addition to any visual indicia applied directly to the main enclosure 702 (e.g., the visual indicia 706), or as a substitute for a visual indicia applied directly to the main enclosure 702. In some cases, the visual indicia 736 being applied to the seal 730 may facilitate obfuscating the way by which the electronic device 110 is configured, for instance by removing the seal 730 once the electronic device 110 has been configured. The seal 732 may be applied to further prevent the opening of the main enclosure 702, and may be included in addition to, or as a substitute for, the seal 730.

By including the visual indicia 620 of the packaging 610 (or the visual indicia 706, 736 of the packaging 700, 700', 700"), the location for applying the external EMF is discernible even when the packaging 610 is closed and the electronic device 110 is not, or not fully, visible. Indeed, in some cases, the visual indicia 120 on the electronic device 110 may be obscured when the electronic device is received within the packaging 610, or in some cases, may be omitted from the housing 112, leaving only the visual indicia 620 to indicate the location for applying the external EMF. In addition, the visual indicia 120 being proximate to the visual indicia 620 when the electronic device 110 is retained within the packaging 610 means that the external EMF can be applied to the electronic device 110 to effect configuration of the electronic device 110 while the electronic device 110 remains retained within the packaging 610. In this fashion, configuration of the electronic device 110 can be performed in a manner that is transparent to any end-user.

From the perspective of the user seeking to configure the electronic device 110, the user may first acquire the electronic device 110, which may still be in a packaging 700 (or any one of the other packaging 610, 700', or 700"). The user may then, if they have not already, obtain a configuration application for use in configuring the electronic device 110. In some cases, the user may obtain the configuration application by scanning or otherwise employing a URL applied to the packaging, for instance the URL 708. In some embodiments, the user employs a smartphone or similar handheld electronic device to both obtain the configuration application and to configure the electronic device 110. In some other embodiments, the user employs a desktop computer or similar computing device to obtain the configuration application, and a handheld peripheral or similar device capable of producing EMFs to configure the electronic device 110. Still other devices may be used in other embodiments.

Once the user has obtained the configuration application, the user may generate configuration data using the configuration application. The configuration application may present any suitable type of graphical user interface (GUI) to the user via which the user can provide input, using any suitable type of input interface (keyboard, mouse, touchscreen, voice recognition software, etc.). In some embodiments, the user may save a set of configuration data, for instance by assigning it a name or other identifier, once the user has finished generating the configuration data. The user can then instruct the configuration application to prepare to configure the electronic device 110. The user may interact with a "Send Configuration" button or similar GUI element to indicate that the configuration data should be provided to the electronic device 110.

When the user indicates that they wish to configure the electronic device 110, the configuration application may then activate transmission hardware within the device capable of producing an EMF. The configuration application may also package the configuration data obtained from the user into a data stream suitable for transmission to the electronic device 110. In cases in which the EMF supplied to the electronic device for power harvesting (i.e., by the antenna 232) is separate from the EMF or other approach used for supplying the data stream to the electronic device 110, multiple transmission hardware may be activated by the configuration application. In this fashion, the device employed by the user produces the EMF to supply power to the configuration system 230, and also transmits the data stream to the configuration system so that the configuration data can be stored in the configuration memory 236. Once the configuration data has been properly transmitted to the configuration system 230 and stored within the configuration memory 236, the electronic device 110 may present a confirmation to the user, as described herein. In some embodiments, the configuration application may also present a confirmation to the user, which may be supplementary to any confirmation provided by the electronic device 110 itself. In some embodiments, the configuration application may also present a summary of the operation to the user, store a record of the operation in some fashion (e.g., for audit purposes), provide a confirmation of the operation to a remote server, and the like.

The user may also employ the device with the configuration application to remove configuration data that had been provided to the electronic device 110, to verify the status of a particular electronic device 110 (e.g., whether configuration data is present in the configuration memory, what the nature of the configuration data is, etc.). The user may also employ the device with the configuration application to supply the electronic device with additional configuration data by repeating the process described herein, as appropriate.

The embodiments of the methods, systems, devices, products, and computer-readable media described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of at least some of the embodiments disclosed herein may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and at least some of the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions, and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

The invention claimed is:

1. An electronic device product, comprising:
an electronic device comprising a housing and a configuration system contained within the housing, the housing bearing on an outer surface thereof a first visual indicia indicative of a location for applying an external electromagnetic field to the electronic device for configuring the electronic device in an unpowered state; and
a packaging, comprising:
a main enclosure for removably retaining therein the electronic device, at least part of the main enclosure being composed of a material transparent to the external electromagnetic field to enable said configuring of the electronic device in the unpowered state; and
a second visual indicia born on an outward-facing surface of the main enclosure, the second visual indicia indicative of the location for applying the external electromagnetic field to the electronic device and disposed in proximity to the first visual indicia when the electronic device is received within the packaging.

2. The electronic device product of claim 1, wherein the main enclosure is entirely composed of the material transparent to the external electromagnetic field.

3. The electronic device product of claim 1, wherein the second visual indicia comprises a portion of the main enclosure which is composed of a first material different from at least a second material composing a remainder of the main enclosure.

4. The electronic device product of claim 3, wherein the first material is transparent visually and to the external electromagnetic field, the first visual indicia being visible through the portion of the main enclosure.

5. The electronic device product of claim 1, wherein the main enclosure defines an indentation in the outward-facing surface thereof for removably receiving an external device producing the external electromagnetic field.

6. The electronic device product of claim 5, wherein the indentation is disposed proximate to the second visual indicia.

7. The electronic device product of claim 5, wherein the second visual indicia is disposed within the indentation.

8. The electronic device product of claim 5, wherein the second indicia comprises at least part of the indentation.

9. The electronic device product of claim 5, wherein at least part of the indentation is transparent visually, the first visual indicia being visible through the at least part of the indentation.

10. The electronic device product of claim 1, wherein the second visual indicia being disposed in proximity to the first visual indicia comprises the second visual indicia overlapping with the first visual indicia when the electronic device is received within the packaging.

11. The electronic device product of claim 1, comprising a seal applied to a portion of the main enclosure to securely retain therein the electronic device, wherein the seal is transparent to the external electromagnetic field.

12. The electronic device product of claim 11, wherein the second visual indicia is disposed on the seal.

13. The electronic device product of claim 1, wherein the packaging comprises a brace disposed within the main enclosure for removably securing the electronic device therewithin.

14. The electronic device product of claim 13, wherein the brace removably securing the electronic device therewithin comprises enforcing a pose of the electronic device within the main enclosure.

15. The electronic device product of claim 13, wherein the brace forms part of the main enclosure.

16. The electronic device product of claim 1, wherein the packaging comprises a printed unique resource locator born on the main enclosure, the unique resource locator indicating a target address at which an application associated with the electronic device is obtainable.

17. The electronic device product of claim 1, the electronic device comprising:
a primary memory powerable by a power source coupled thereto;
a configuration memory for storing configuration data, the configuration memory separate from the primary memory;
an antenna coupled to the configuration memory to provide power thereto when subjected to an external electromagnetic field and to transmit configuration data obtained via a data stream to the configuration memory for storage therein; and
a primary controller powerable by the power source and coupled to the primary memory and to the configuration memory, the primary controller configured for, upon powering on of the electronic device via the power source:
querying the configuration memory to determine a presence of the configuration data; and
responsive to said determining the presence of the configuration data, loading the configuration data into the primary memory to cause the electronic device to operate in accordance with the configuration data.

18. The electronic device product of claim 17, wherein the primary controller is configured for, upon said powering on of the electronic device and responsive to determining an absence of the configuration data, causing the electronic device to operate in accordance with alternative configuration data, wherein the alternative configuration data is one of default configuration data, past configuration data, and backup configuration data.

19. The electronic device product of claim 17, wherein the primary controller is configured for, upon said powering on of the electronic device, validating a digital signature associated with the configuration data, wherein said loading the configuration data into the primary memory is responsive to the digital signature associated with the configuration data being validated.

20. The electronic device product of claim 17, wherein the primary controller is configured for, following said loading the configuration data into the primary memory, communicating a message to a remote server identified in the configuration data.

21. The electronic device product of claim 17, wherein the primary controller is configured for, following said loading the configuration data into the primary memory:

performing a validation of the configuration data; and loading alternative configuration data into the primary memory to cause the electronic device to operate in accordance with the alternative configuration data responsive to the configuration data failing the validation.

22. The electronic device product of claim 17, wherein the housing contains at least some of the primary memory, the configuration memory, the antenna, and the primary controller, and wherein the first visual indicia borne on the housing is positioned for causing the antenna to be subjected to the external electromagnetic field when the external electromagnetic field is applied in proximity to the first visual indicia.

23. The electronic device product of claim 17, wherein the configuration memory is configured for providing a confirmation via the antenna to an external device when queried, the confirmation relating to a configuration status of the electronic device.

24. The electronic device product of claim 23, wherein the confirmation provides an indication of the configuration data stored in the configuration memory.

25. A packaging for an electronic device configurable in an unpowered state via a configuration system thereof, at least the configuration system being contained in a housing of the electronic device, the housing comprising a location for applying an external electromagnetic field to the electronic device for configuration thereof via the configuration system, the packaging comprising:

a main enclosure for removably retaining therein the electronic device, at least part of the main enclosure being composed of a material transparent to the external electromagnetic field to enable said configuration of the electronic device in the powered off state; and a visual indicia born on an outward-facing surface of the main enclosure, the visual indicia indicative of the location for applying the external electromagnetic field to the electronic device and disposed in proximity to the location of the housing when the electronic device is received within the packaging.

26. The packaging of claim 17, wherein the main enclosure is entirely composed of the material transparent to the external electromagnetic field.

27. The packaging of claim 17, wherein the visual indicia comprises a portion of the main enclosure which is composed of a first material different from at least a second material composing a remainder of the main enclosure.

28. The packaging of claim 27, wherein the first material is transparent visually and to the external electromagnetic field, wherein the location for applying the external electromagnetic field is visible through the portion of the main enclosure.

29. The packaging of claim 17, wherein the main enclosure defines an indentation in the outward-facing surface thereof for removably receiving an external device producing the external electromagnetic field.

30. The packaging of claim 29, wherein the visual indicia is disposed within the indentation.

31. The packaging of claim 29, wherein the second indicia comprises at least part of the indentation.

32. The packaging of claim 29, wherein at least part of the indentation is transparent visually, wherein the location for applying the external electromagnetic field is visible through the at least part of the indentation.

33. The packaging of claim 17, wherein the visual indicia being disposed in proximity to the location comprises the visual indicia overlapping with the location when the electronic device is received within the packaging.

34. The packaging of claim 17, comprising a seal applied to a portion of the main enclosure to securely retain therein the electronic device, wherein the seal is transparent to the external electromagnetic field.

35. The packaging of claim 34, wherein the visual indicia is disposed on the seal.

36. The packaging of claim 17, wherein the packaging comprises a brace disposed within the main enclosure for removably securing the electronic device therewithin.

37. The packaging of claim 36, wherein the brace removably securing the electronic device therewithin comprises enforcing a pose of the electronic device within the main enclosure.

\* \* \* \* \*